(12) United States Patent
Carter et al.

(10) Patent No.: US 8,522,717 B2
(45) Date of Patent: *Sep. 3, 2013

(54) TOP-FILL HUMMINGBIRD FEEDER

(75) Inventors: James S. Carter, Denver, CO (US);
Bryan Krueger, Denver, CO (US)

(73) Assignee: Woodstream Corporation, Lititz, PA (US)

( * ) Notice: Subject to any disclaimer, the term of this patent is extended or adjusted under 35 U.S.C. 154(b) by 63 days.

This patent is subject to a terminal disclaimer.

(21) Appl. No.: 12/929,117

(22) Filed: Jan. 3, 2011

(65) Prior Publication Data

US 2011/0100300 A1    May 5, 2011

Related U.S. Application Data

(63) Continuation of application No. 11/785,905, filed on Apr. 20, 2007, now Pat. No. 7,861,671.

(51) Int. Cl.
*A01K 7/00* (2006.01)

(52) U.S. Cl.
USPC ............... 119/72; 119/57.8; 119/74; 119/75

(58) Field of Classification Search
USPC .............. 119/51.1, 52.2, 52.3, 57.8, 57.9, 119/72, 72.5
IPC .............. A01K 01/10, 05/00, 39/00, 39/02, A01K 61/02, 07/00
See application file for complete search history.

(56) References Cited

U.S. PATENT DOCUMENTS

| | | | | |
|---|---|---|---|---|
| 4,691,665 A | * | 9/1987 | Hefner | 119/77 |
| 5,111,772 A | * | 5/1992 | Lipton | 119/57.9 |
| 5,682,835 A | * | 11/1997 | Walter et al. | 119/57.8 |
| 5,806,460 A | * | 9/1998 | Klein | 119/72 |
| 5,823,135 A | * | 10/1998 | Gilchrist et al. | 119/52.2 |
| D472,351 S | * | 3/2003 | Griffin | D30/128 |
| 6,647,921 B2 | * | 11/2003 | Stokes et al. | 119/52.3 |
| 6,659,041 B1 | * | 12/2003 | Curts | 119/52.2 |
| 6,758,164 B2 | | 7/2004 | Rich | |

(Continued)

OTHER PUBLICATIONS

Woodstream Hummingbird Feeder with Wooden Housing.

(Continued)

*Primary Examiner* — David Parsley
*Assistant Examiner* — Thien Thanh Pham
(74) *Attorney, Agent, or Firm* — Jacobson Holman PLLC

(57) ABSTRACT

A liquid birdfeeder includes a generally upstanding container having a large opening at its top end and a bottleneck opening at its lower end. A quarter-turn removable cap is screw-threaded onto the top end to seal the top end opening. The lower bottleneck opening is screw-threaded into a central collar of a feeding basin having a plurality of feeding ports. An actuator rod extends longitudinally through the container and is operatively connected to a biased sealing mechanism which selectively seals or opens the bottleneck opening. When the removable cap is screw-threaded onto the top end opening, the cap depresses the actuator rod causing the biased sealing mechanism to move to an open position which allows liquid to flow out from the container into the feeding basin. When the removable cap is removed, the actuator rod can move upwardly under the force of the biased sealing mechanism, which moves the sealing mechanism to a closed position and prevents liquid in the container from flowing into the feeding basin. The container can then be filled through the top opening without flooding the feeding basin. In one preferred embodiment, the bird feeder includes a common functional feeding module connected within an outer decorative cladding by an interference fit.

20 Claims, 22 Drawing Sheets

(56) References Cited

U.S. PATENT DOCUMENTS

| | | | |
|---|---|---|---|
| 7,000,566 B2 * | 2/2006 | Fort, II | 119/69.5 |
| 7,228,993 B2 * | 6/2007 | Yang | 222/365 |
| 7,231,890 B2 * | 6/2007 | Colvin | 119/72 |

OTHER PUBLICATIONS

Woodstream Hummingbird Feeder with Hummingbird-Style Cage for Hanging Feeder.

Woodstream Hummingbird Feeder with Flower-Style Cage for Hanging Feeder.

Woodstream Oriole Feeder with Fruit-Style Cage for Hanging Feeder.

Woodstream Bird Feeder with Squirrel-Proof Outer Cage.

* cited by examiner

TOP-FILL HUMMINGBIRD FEEDER

This is a continuation application of U.S. Ser. No. 11/785,905, filed Apr. 20, 2007, now U.S. Pat. No. 7,861,671 and hereby claims the priority thereof to which it is entitled.

BACKGROUND OF THE INVENTION

1. Field of the Invention

The present invention relates to liquid bird feeders, particularly hummingbird feeders, and mechanisms for shutting off the flow of liquid food from a reservoir to a feeding basin to allow for more facile filling and cleaning of the feeder.

2. Description of the Related Art

People who live in an area inhabited by hummingbirds frequently try to promote their presence by the use of hummingbird feeders. Hummingbird feeders differ from ordinary bird feeders because hummingbirds feed on nectar or simulated nectar, which are liquid, instead of the dry food consumed by most birds. Simulated nectar is typically formed from water sweetened with sugar or honey. In many hummingbird feeders, the nectar (or simulated nectar) is stored in a reservoir and conveyed to simulated flowers where a perch may be provided so that the hummingbird can land and, having a long, slender beak, insert it into the access apertures in the simulated flower and feed.

Most hummingbird feeders have one of two basic designs. One includes an inverted top container which empties into a lower reservoir or feeding basin from which the birds feed. The vacuum at the top of the container (or put another way, the outside air pressure) keeps the liquid in the top container from draining out too rapidly. The other common feeder design consists of a container with holes in its cover through which the hummingbirds reach to feed. This latter style of feeder suffers from the problem that it must be refilled very often, because the level of food is constantly being reduced by the feeding.

The so-called "vacuum-type" feeders also have problems. For example, they can only be filled by dismantling the feeder and removing the top container from its feeding position. Ordinarily, the consumer must invert the feeder in order to refill it, with the attendant risks of spillage, and requires a certain amount of manual dexterity to create the necessary vacuum. Moreover, because a vacuum is required, these designs are limited to a single opening for filling and cleaning. This opening is typically small, which restricts access to the interior of the container and makes it more difficult to effectively clean the container. Additionally, vacuum feeders can corrode or be inefficient, permitting the nectar to leak and creating an increased risk of insect contamination.

One product which has been available in the market is the Garden Song Top Fill Hummingbird Feeder from Opus Incorporated. The Opus feeder includes an upstanding liquid container with a large top opening and a small cylindrical lower opening which is screw-threaded into an upstanding cylindrical collar positioned in the center of a feeding basin or liquid tray. The top opening is closed with a cover that seals the container to create a vacuum as the liquid level recedes downwardly in the container. An internal, rotatable ring or valve mechanism has an upstanding cylindrical wall which surrounds the cylindrical collar inside the feeding basin.

The wall of the cylindrical collar has a plurality of ports, and the cylindrical wall of the rotatable ring has a plurality of corresponding openings. When the openings in the rotatable ring are aligned with the ports of the collar using an externally accessible lever, nectar can flow out of the container lower opening, through the aligned ports and openings, and into the feeding basin or liquid tray. When the rotatable ring is rotated using the externally accessible lever, so that its openings are not aligned with the ports of the collar, the nectar flow from the container to the feeding base is cut off. In this condition, the cover can be removed from the container top opening for (re)filling the container without nectar in the container flowing out through the collar to flood and overflow the feeding base or liquid tray. This design also permits the top opening to be large enough to facilitate easy cleaning of the bottle.

There have also been modular designs for hummingbird feeders in which a common functional feeding module is utilized in conjunction with changeable decorative outer claddings. However, such prior art hummingbird modular feeders suffer the same drawbacks as discussed above.

SUMMARY OF THE INVENTION

It is an object of the present invention to provide a reliable, consumer-friendly hummingbird feeder having a liquid-holding container or bottle with a large open top for easy top filling and cleaning of the container.

Another object of the present invention is to provide a hummingbird feeder in which the liquid-holding container or bottle does not have to be inverted after filling in order to create a vacuum to control flow of the liquid nectar to the feeding basin or liquid tray.

A further object of the present invention is to provide a hummingbird feeder with a liquid-holding container or bottle having a lower bottleneck opening and with a stopper or sealing mechanism for the bottleneck opening which is connected to an actuator rod operated by the screwing and unscrewing of the cap covering the bottle large top opening.

Still another object of the present invention is to provide a hummingbird feeder in accordance with the preceding objects, which includes a top-fill liquid holding container or bottle in combination with a feeding basin which together serve as a common functional feeding module that can be fitted into different decorative claddings so that it is no longer necessary to retool all of the components in order to produce a hummingbird feeder with a different decorative look.

A final object to be recited herein is to provide a hummingbird feeder in accordance with the preceding objects, which has components that can be easily manufactured from readily available and known materials and that can be easily assembled for ease and economy of manufacture and easily disassembled and reassembled for easy cleaning and which will be sturdy and long lasting in operation and use.

These and other objects are achieved by a hummingbird feeder which includes a generally upstanding reservoir bottle or liquid container having a large opening at its top end. A removable top or cap is screw-threaded onto the top end to close and seal the top end opening. The bottom of the bottle or container has a lower bottom opening, preferably in the form of a threaded bottleneck, which can be screw-threaded into a central collar of a feeding basin that has a plurality of feeding ports in a known arrangement. An upwardly biased sealing mechanism is connected to the bottom end of an actuator rod positioned longitudinally down the center of the reservoir bottle.

The sealing mechanism and actuator rod are operatively movable between a first or down position and a second or up position by screw-threading the removable top onto and off of, respectively, the reservoir bottle top open end. When the actuator rod and the sealing mechanism move to the down position by closing the top cap, the sealing mechanism opens the bottle lower opening and allows the flow of liquid nectar out of the reservoir bottle into the feeding basin. When the actuator rod and sealing mechanism move to the up biased closed position by removing the top cap, the sealing mechanism seals off the bottle lower opening and prevents liquid nectar from flowing out of the bottle into the feeding basin.

The removable cap is threaded onto the top opening of the reservoir bottle to create a vacuum-generating seal between the removable cap and the reservoir bottle, such as by a conventional ring seal between the cap and an upper surface of the bottle as known by those skilled in the art. When the removable cap is not in a sealed position it is in an unsealed position. When the removable cap is in the sealed position (and the vacuum seal in place), the actuator rod is held in its first or down position. When the removable cap is in the unsealed position (breaking the vacuum seal), the actuator rod moves up into its second or up position. When the actuator rod is in its first or down position the sealing mechanism is in an open position, and permits the reservoir bottle to be in fluidic communication with the feeding basin. When the removable top is moved into the unsealed position and/or removed, the bias of the sealing mechanism moves the actuator rod up into its second or up position and the sealing mechanism moves into its closed position, thus blocking the passage of liquid out of the bottom opening of the reservoir bottle into the feeding basin.

The mating threads of the removable cap and upstanding neck around the large opening at the top of the reservoir bottle are preferably of a "quarter turn" design. That is, only a quarter turn of the cap is required for it to go from a sealed position to an unsealed position, and vice versa. The quarter turn thread design quickens the motion of the actuator rod between its up and down positions, and correspondingly the open and closed positions of the biased sealing mechanism, thus reducing the time during which liquid nectar in the reservoir bottle can freely flow into the feeding basin before the sealing mechanism stops the flow, in the sealed position, or the vacuum at the top of the sealed reservoir restrains the flow when the sealing mechanism is in the open position.

In one preferred embodiment, the top fill hummingbird feeder of the present invention includes a common functional feeding module which can be fitted into different decorative claddings so as to change the appearance of the feeder without having to re-tool all of the feeder components. The common functional feeding module includes a top fill liquid holding container or reservoir bottle with a bottleneck bottom opening which is fitted into a central collar of the feeding basin. The bottleneck opening is opened and closed by a sealing mechanism and actuator rod as previously described. The feeding basin has a plurality of protruding tabs around its periphery which are rotationally received in an interference fit within tab receptacles in the base of the decorative cladding.

The foregoing together with other objects and advantages which will become subsequently apparent reside in the details of construction and operation as more fully hereinafter described and claimed, reference being had to the accompanying drawings forming a part hereof, wherein like numerals refer to like parts throughout. The drawings are not intended to be to scale.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The combination of elements, arrangement of parts and features of construction that lead to the top-fill hummingbird feeder of the instant invention will be pointed out in more detail hereinafter with respect to the accompanying drawings in which like parts are designated by like reference characters throughout the several views of the drawings, wherein.

DETAILED DESCRIPTION OF THE PREFERRED EMBODIMENTS

Figure 1:
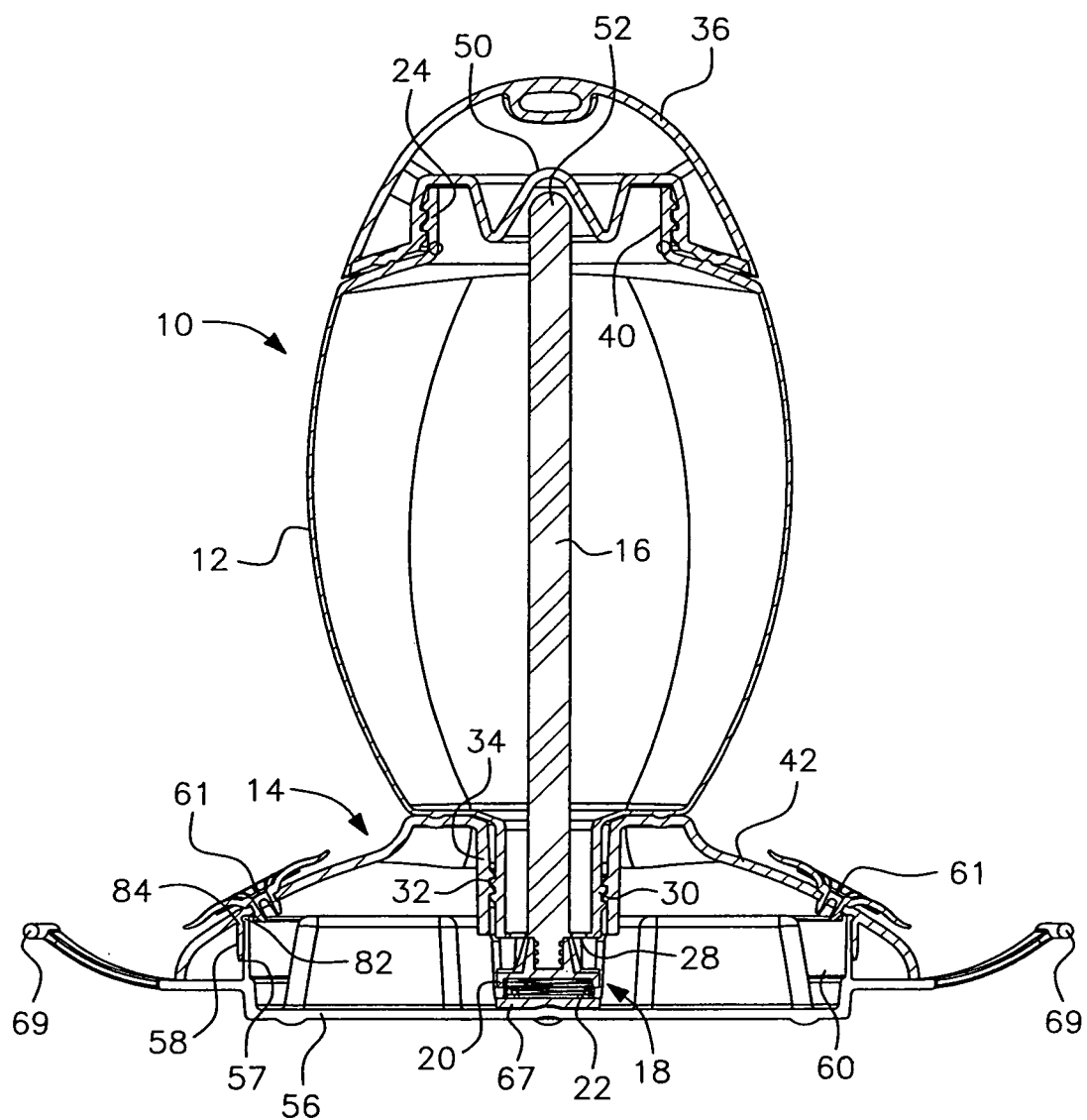
FIG. 1 is a partially cut-away cross-sectional side view of a first embodiment of a hummingbird feeder according to the present invention, with the feeder in the feeding position.

Although preferred embodiments of the invention are explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiments, terminology will be resorted to for the sake of clarity. It is intended that each term contemplates its broadest meaning as understood by those skilled in the art, and includes all technical equivalents which operate in a similar manner to accomplish a similar purpose.

Figure 2:
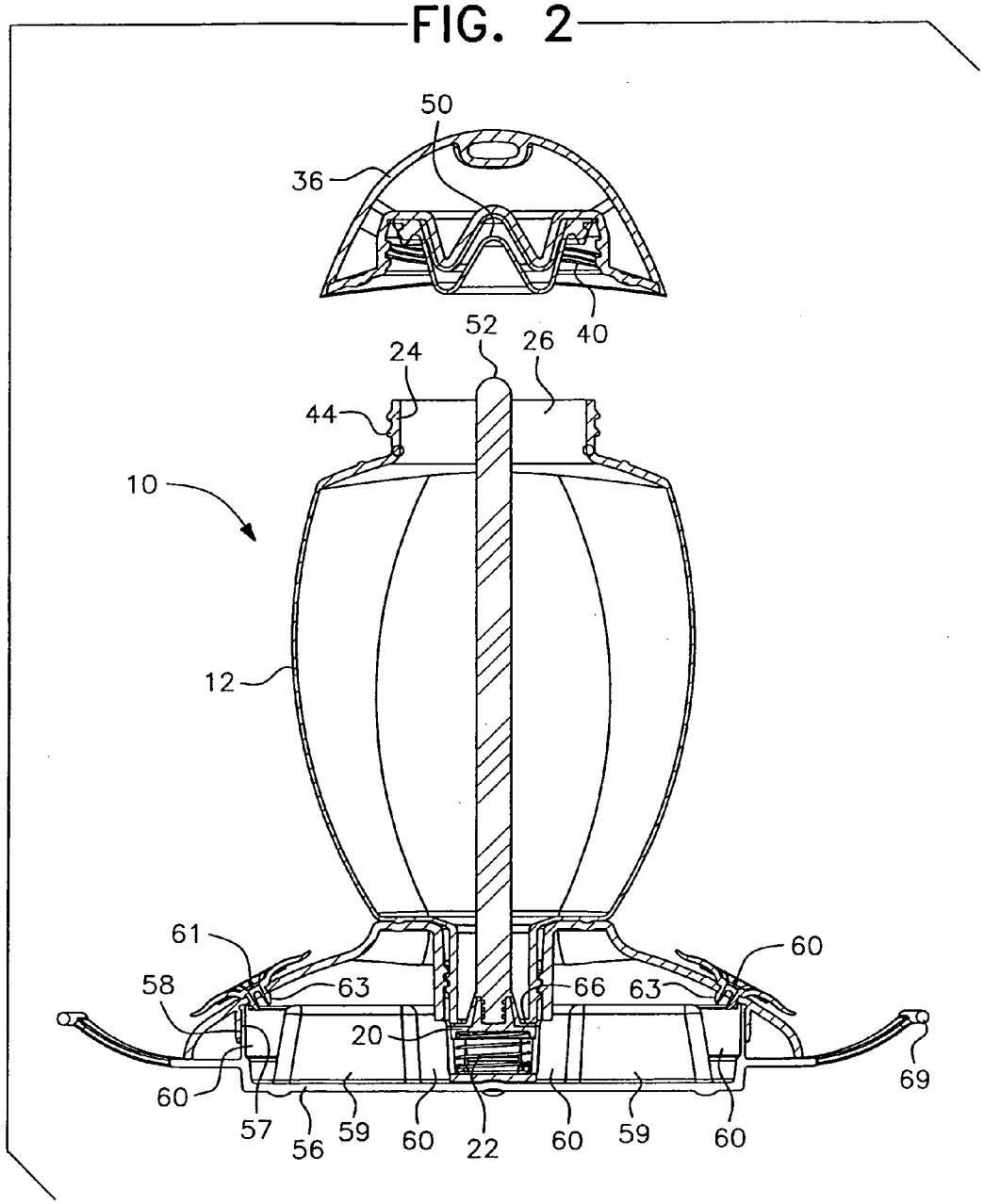
FIG. 2 is a side view similar to FIG. 1 of the hummingbird feeder of FIG. 1, with the cap removed and the feeder in the filling position.
Figure 3:
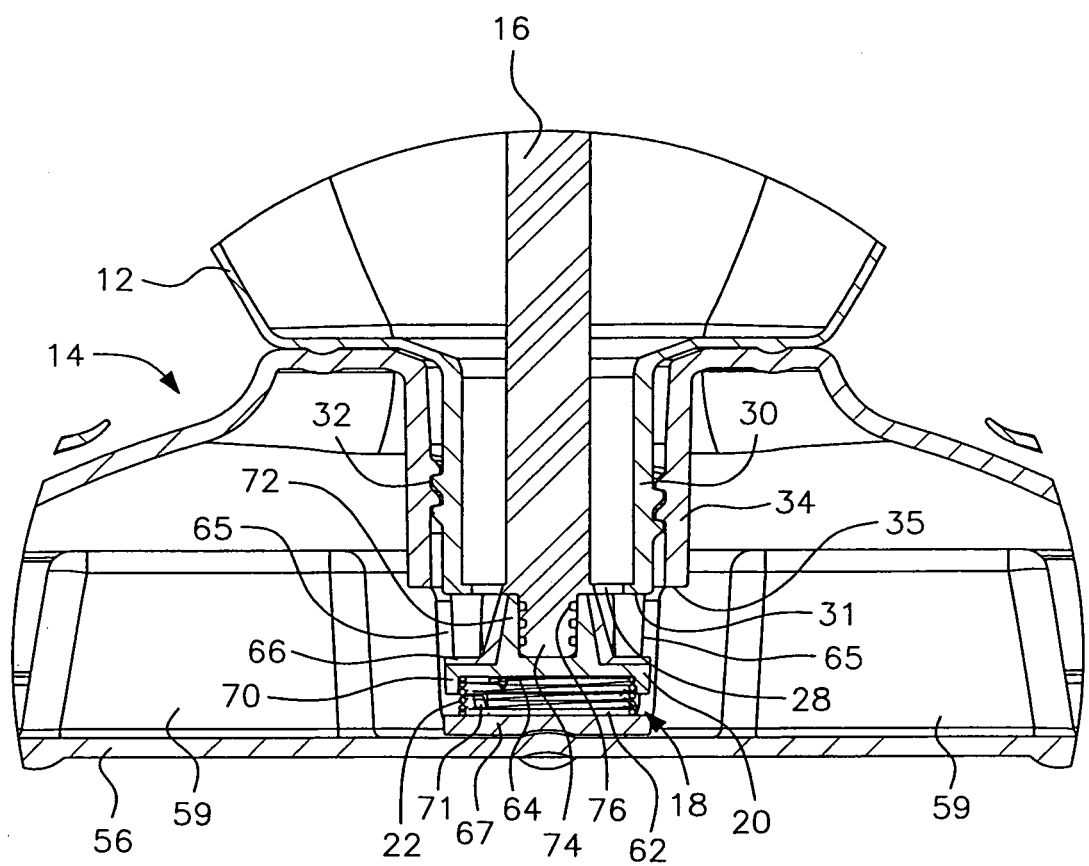
FIG. 3 is an enlarged cross-sectional side view of the hummingbird feeder of FIG. 1, showing the bottleneck lower opening, the central portion of the feeding basin, and the bottom end of the actuator rod connected to the sealing mechanism.

Referring to the drawings, FIGS. 1-3 illustrate a hummingbird feeder generally designated by reference numeral 10. The feeder 10 consists of three basic components: a reservoir bottle or liquid container 12; a feeding basin or liquid tray generally designated by reference numeral 14; and a biased sealing mechanism generally designated by reference numeral 18. In accordance with the invention, the biased sealing mechanism 18 includes an actuator rod 16 extending generally vertically down the center of the reservoir bottle 12 and into the feeding basin 14 and a biasing element which provides counter forces to the actuator rod.

Figure 16:
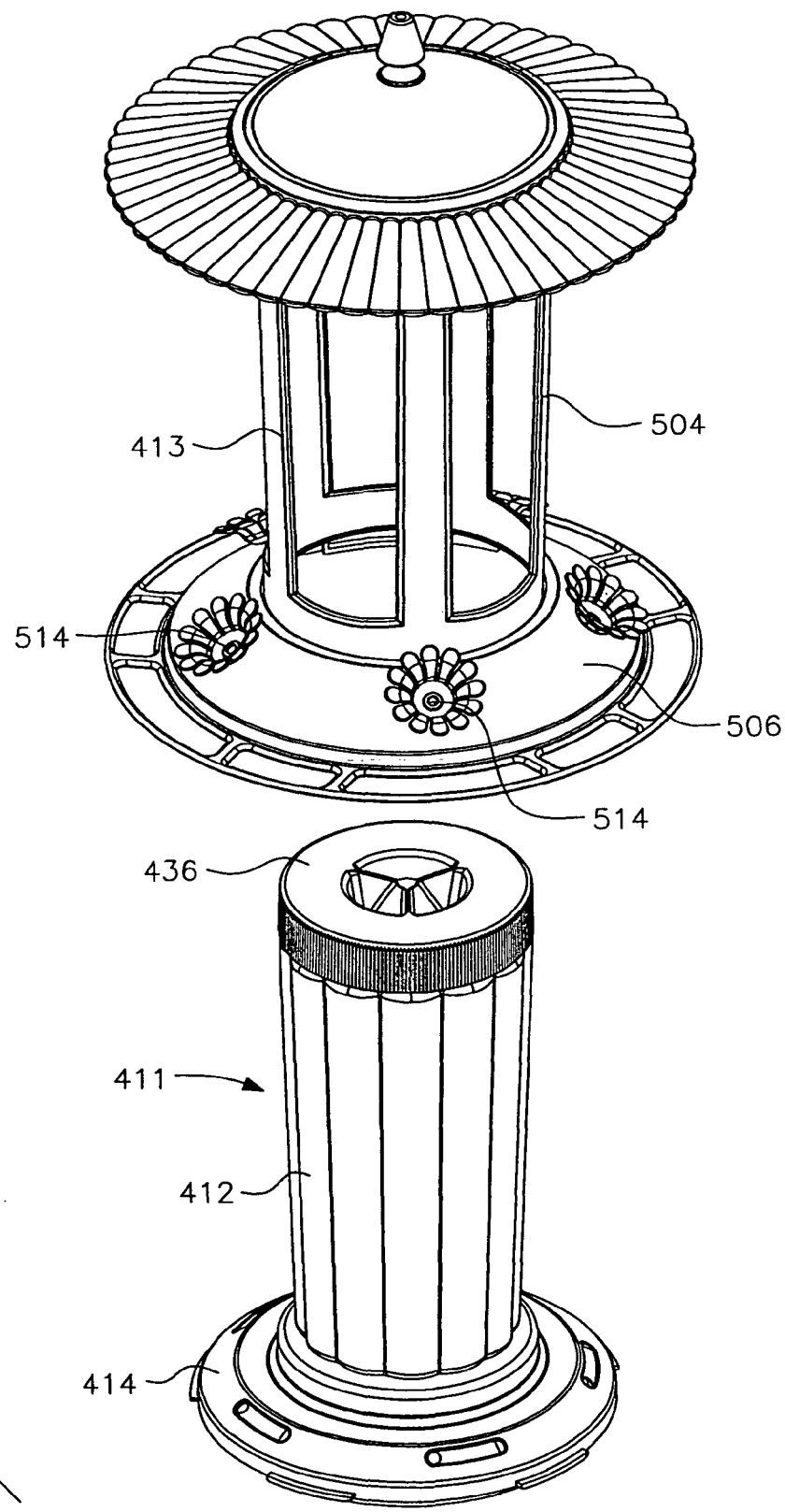
FIG. 16 is an exploded perspective view of the decorative cladding separated from the common functional feeding module of the hummingbird feeder of FIG. 15.
Figure 17:
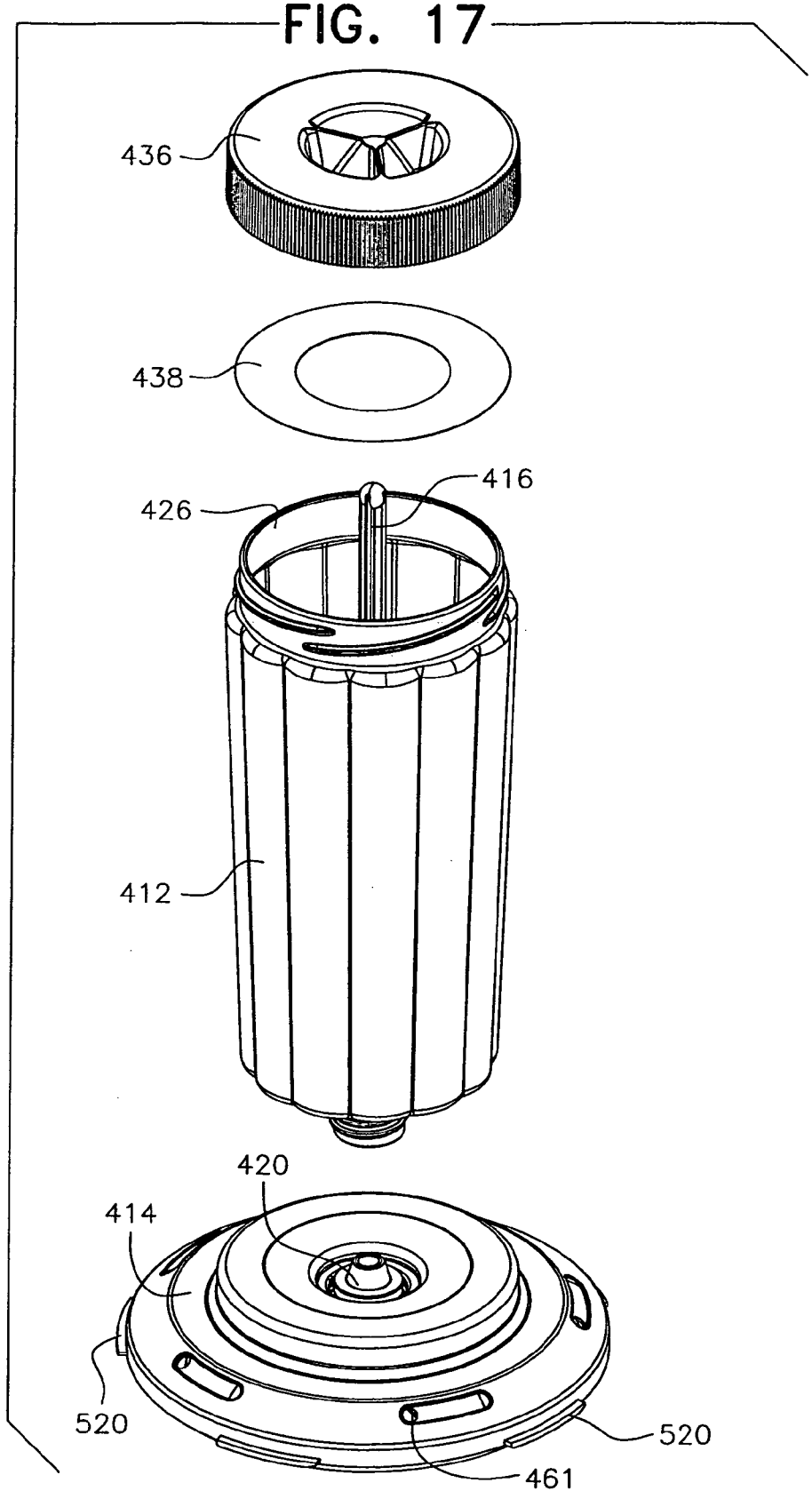
FIG. 17 is an exploded perspective view showing the components of the common functional feeding module of the hummingbird feeder of FIG. 15.

In the FIG. 1-3 embodiment, the biased sealing mechanism is in the form of a sealing ring or stopper 20 mounted on the lower end of actuator rod 16 and biased upwardly by compression spring 22. The reservoir bottle 12 can be in any desired shape, although it is preferably longer in height than width so as to provide the requisite partial vacuum above the liquid nectar contained therein. Examples are an elliptical shape as shown for reservoir bottle 12 and a cylindrical shape, such as shown for reservoir bottles 312 (see FIGS. 12-14) and 412 (see FIGS. 16-18).

The reservoir bottle 12 has an upstanding neck 24 forming a large opening 26 at its upper end for easy filling and cleaning of the reservoir bottle. The bottom of the reservoir bottle 12 has a smaller lower opening 28, preferably in the form of a bottleneck 30 with screw threads 32, so that it can be screw-threaded into a generally vertical collar 34 located centrally in the cover 42 of feeding basin 14. When screw-threaded in place, the lower edge 31 of bottleneck 30 extends adjacent the lower end 35 of collar 34 into the interior of feeding basin 14.

Figure 5:
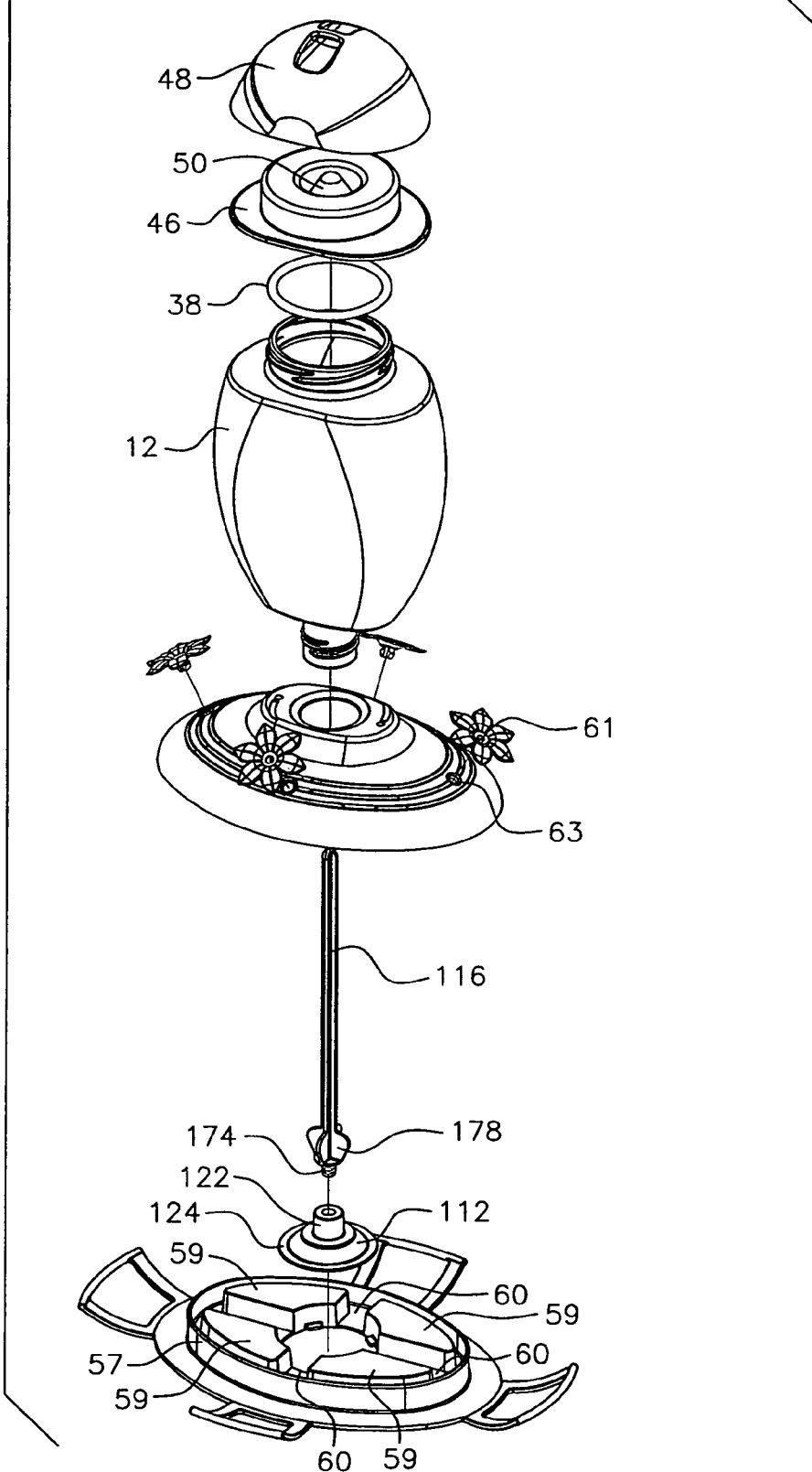
FIG. 5 is an exploded perspective view of the hummingbird feeder of FIG. 4.

A removable top or cap 36 closes off the large opening 26 at the top of the reservoir bottle 12 in a sealed condition, as by a conventional ring seal 38, see FIG. 5. The cap 36 preferably has internal threads 40 which mate with external threads 44 on upstanding neck 24. The mating threads of the removable cap 36 and upstanding neck 24 are preferably of the "quarter turn" design in which a quarter turn of the cap 36 allows it to go from a sealed position to an unsealed position, and vice versa.

The removable cap 36 is preferably made of two pieces for ease of manufacture, a lower shell 46 and an upper shell or cover 48 (see FIG. 5). The top shell or cover 48 is shaped to complete the elliptical design of the outer surface of the reservoir bottle 12. The lower shell 46 is molded to provide the internal threads 40 and a central notch 50, which operatively engages the top 52 of the actuator rod 16. The top 52 of the actuator rod 16 is preferably rounded and notch 50 is preferably tapered and round at its apex to facilitate their operative interaction, as will be described hereinafter.

The feeding basin 14 is generally circular in plan view with a cover 42 and a base 56 molded of suitable polymer material. The base 56 includes a vertical rim 57 extending around its periphery to define nectar holding chambers 60 and is received in a mating vertical flange 58 depending around the periphery of the cover 42. The base 56 is attached to the cover 42 by any suitable plastic parts attaching mechanism, such as protruding flanges 82 at the top of rim 57 which extend into corresponding slots 84 in flange 58, as well known to those skilled in the art. The base 56 is preferably molded with upstanding protrusions 59 which help define nectar chambers 60 adjacent feeding ports 61 and reduce the volume of nectar required to fill the base 56.

The cover 42 is molded to include the threaded collar depending centrally therein and openings 63 to receive feeding ports 61. The cover 42 is also molded with legs 65 extending downwardly from collar 34 which terminate in a platform 67. The platform 67 supports the base of compression spring 22 and the legs 65 surround the sides of the compression spring during its expansion and compression. The platform 67 preferably has upstanding protrusions 71 on its upper surface which center the base of spring 22 on the platform. The base 56 is also preferably formed with perches 69 to support the hummingbirds when feeding. The spring 22 extends upwardly so that it engages the underneath side 64 of sealing plug or stopper 20.

Stopper 20 is preferably disk-shaped with an annular upper surface 66 to engage the bottom edge' 31 of the bottleneck and close off the lower opening 28, thus preventing liquid flow from bottle 12. A flange 70 depending from the periphery of stopper 20 surrounds the top of spring 22 to keep the spring and stopper aligned. A conical projection 72 extends upwardly from the center of the stopper 20 for connection to the lower end 74 of the actuator rod 16, as by threaded engagement 76 as shown. The stopper 20 is preferably coated with or formed of a silicone, rubber or other elastomeric material to aid in sealing. Alternatively, a washer or O-ring of such material could be positioned on the top of the stopper 20 to perform the sealing function.

The operation of the feeder 10 can be described as follows. When the removable cap 36 is threaded onto threads 44 of the reservoir bottle 12 into the sealed position, as shown in FIG. 1, the notch 50 presses downwardly on the top 52 of the actuator rod 16, forcing the rod and the stopper 20 to move downwardly against the upward bias of the spring 22 and away from the lower opening 28 of the bottle 12. with the cap 36 in the sealed position and the sealing plug 20 away from the opening 28, liquid nectar in bottle 12 can flow out of the bottle, thus immersing the bottleneck opening 28, and into the holding chambers 60 of the feeding basin or liquid tray 14. The nectar in the holding chambers can then be accessed by hummingbirds through feeding ports 61. With the cap 36 sealed over opening 26, as the liquid nectar in bottle 12 flows out of the bottle, a partial vacuum is created in the top of the bottle above the liquid nectar remaining therein. Outside air pressure pressing down on the nectar in holding chambers 60 through the feeding ports 61 keeps the nectar from flowing out of the feeding basin 14 while still immersing the bottleneck opening 28, in the conventional manner.

When the removable cap 36 is removed from threads 44 at the top of the reservoir bottle 12, as shown in FIG. 2, notch 50 no longer pushes down on the top 52 of the actuator rod, and thus the biased stopper 20. The stopper 20 is then free to be pushed upwardly by compression spring 22, causing the upper surface 66 to close off the bottleneck opening 28 and the liquid flow from bottle 12 into holding chambers 60. Thus, as shown in FIG. 2, when cap 36 has been removed, the user can easily pour additional nectar into the reservoir bottle 12 through the large opening 26 without causing the liquid nectar to flood out of the feeding basin through the feeding ports 61.

Figure 4:
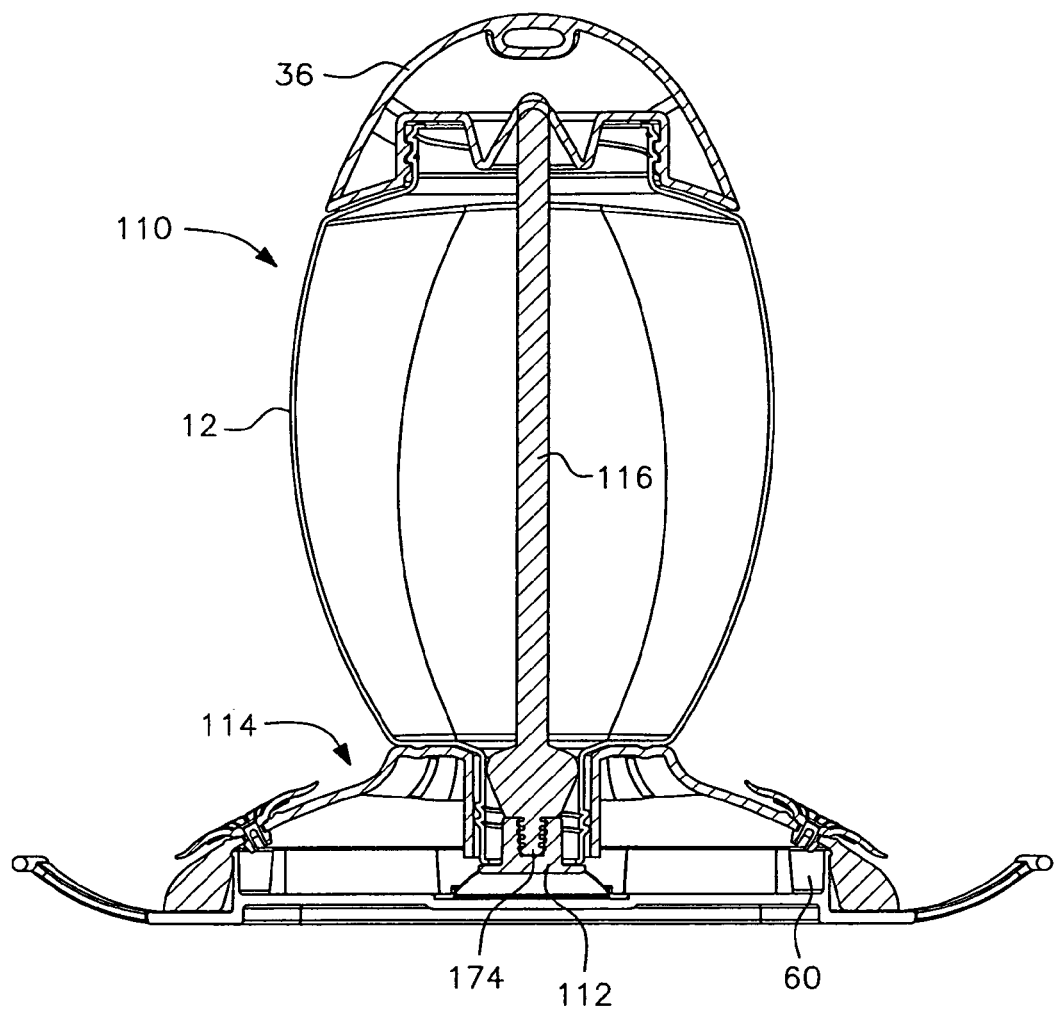
FIG. 4 is a partially cut-away cross-sectional side view, similar to FIG. 1, of a second embodiment of a hummingbird feeder according to the present invention.
Figure 6:
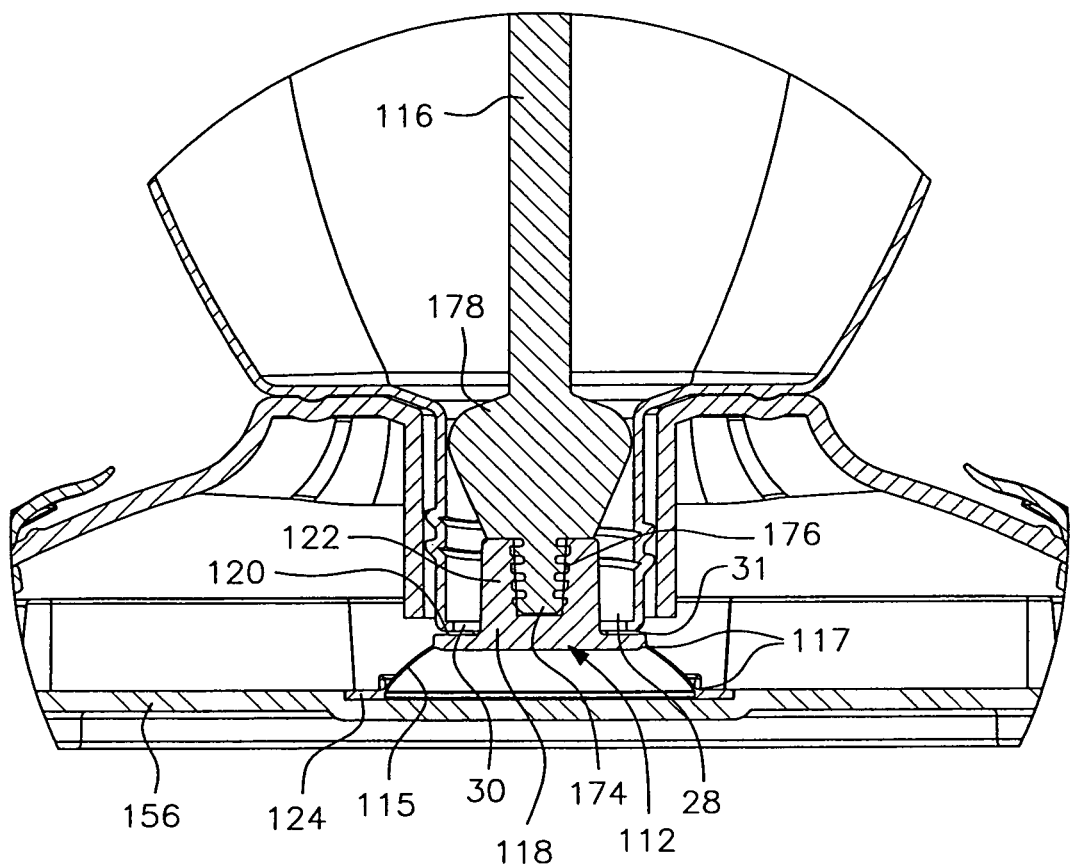
FIG. 6 is an enlarged cross-sectional side view of the hummingbird feeder of FIG. 4, showing the bottleneck lower opening, the center portion of the feeding basin, and the bottom end of the actuator rod connected to the sealing mechanism.
Figure 7:
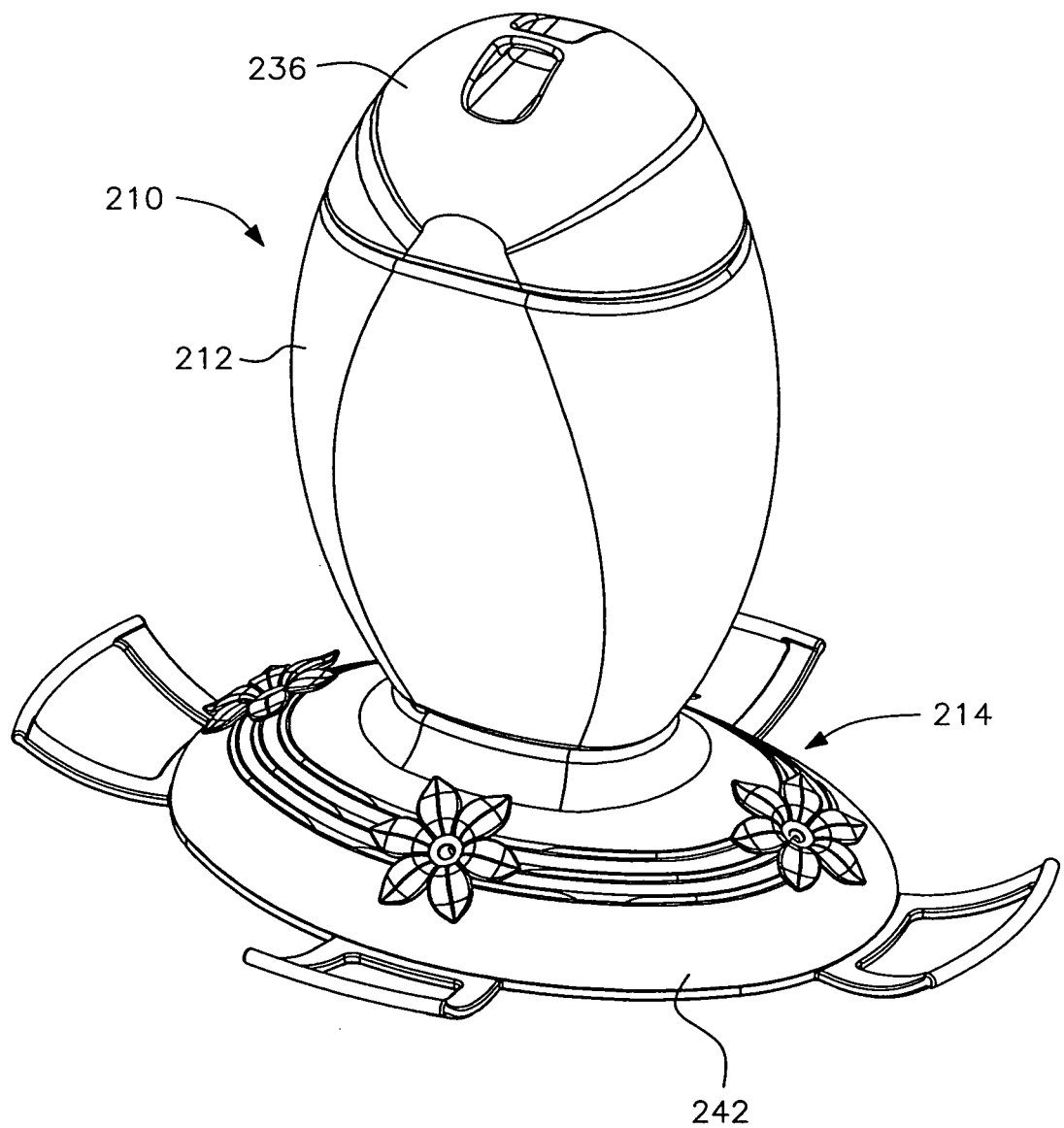
FIG. 7 is a side perspective view of a third embodiment of a hummingbird feeder according to the present invention.
Figure 8:
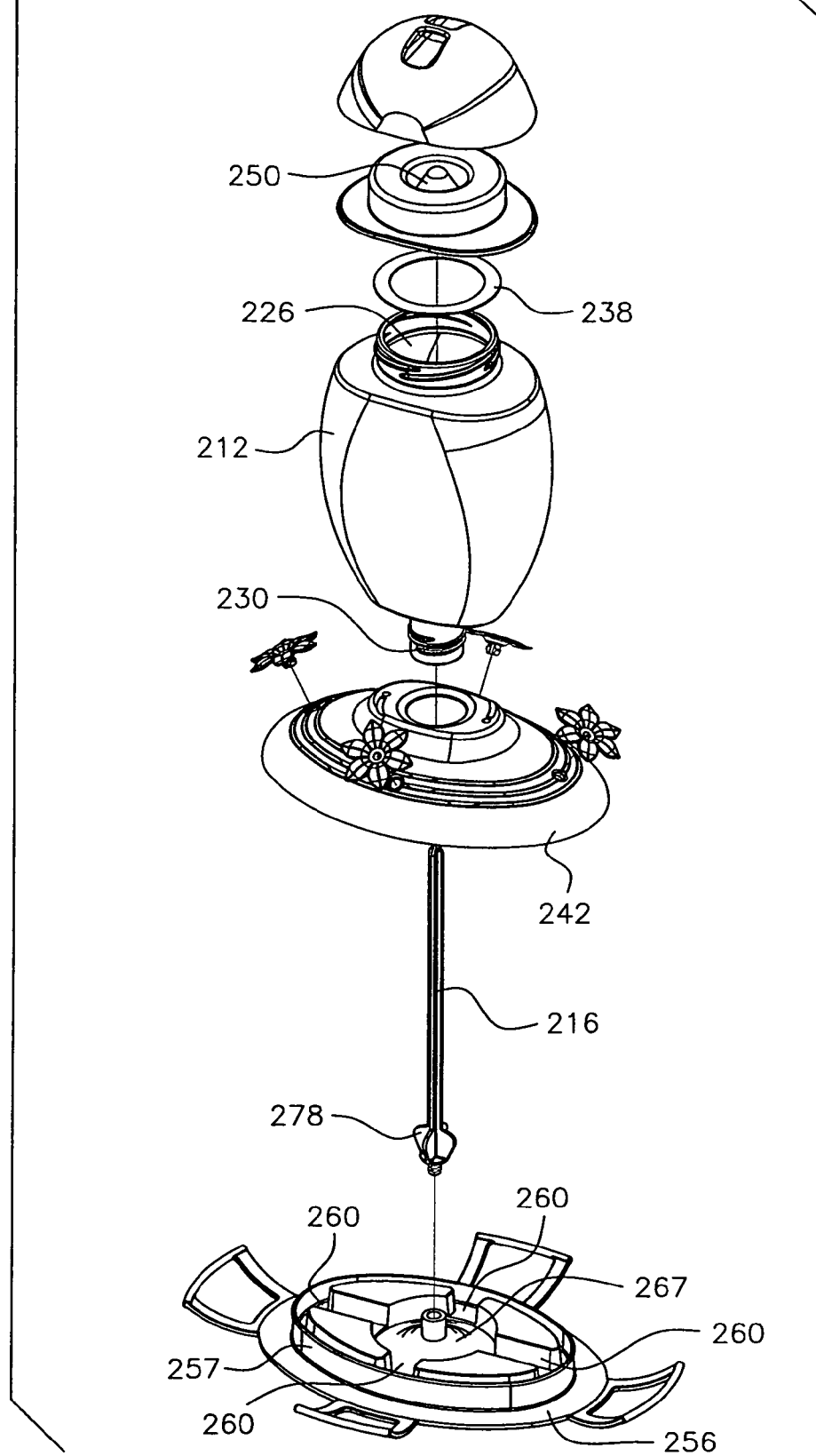
FIG. 8 is an exploded perspective view of the hummingbird feeder of FIG. 7.

Turning now to FIGS. 4-6 of the drawings, there is shown another embodiment of a hummingbird feeder according to the present invention generally designated by reference numeral 110. Most of the components of feeder 110 are the same as the corresponding components of feeder 10, except for the lower portion of the actuator rod and the biased sealing mechanism for the reservoir bottle lower opening. Accordingly, like numerals from feeder 10 are used in conjunction with feeder 110 in drawing FIGS. 4-6, and the corresponding structure will not be repeated, except the feeder basis 14 is elliptical in shape and the reservoir bottle 12 is elliptical in cross-section (see FIG. 5).

The biased sealing mechanism in this embodiment is in the form of an inverted rubber or rubber-like button, generally designated by reference numeral 112, having a generally flat bell shape, connected to the bottom of actuator rod 116. The button 112 includes a peripheral flange 124 to support the button on the top surface of the base 156. Interior of the flange 124 is an annular section 115 which is connected to a central disk-like stopper 118, thus defining "collapsing points" 117 to collapse the button under prescribed forces. The stopper 118 has an annular upper surface 120 and a cylindrical projection 122 which extends upwardly from the center of the stopper 118 for connection to the lower end 174 of the actuator rod 116, as by threaded engagement 176 as shown. The actuator rod lower end 174 has laterally extending fins 178, preferably four in number, to assist in centralizing and aligning the rod lower end 174 in the bottleneck 30.

The button 112, as previously stated, is preferably made of rubber or other elastomeric material and is engineered so that when no pressure is applied to it by actuator rod 116, stopper upper surface 120 presses against the bottom edge 31 of the bottleneck opening 28 to seal this lower opening. Liquid nectar in bottle 12 is thus unable to flow into the feeding basin 114. When the actuator rod 116 is depressed by threading the removable cap 36 into the sealed position, the stopper 118 of the button 112 is depressed, thus unsealing bottle opening 28 and permitting liquid nectar to flow from the bottleneck 30 into holding chambers 60.

Preferably, the button 112 is engineered (e.g. thickness, geometry, materials used, etc.) so that when it is not being flexed by the actuator rod 116, the annular upper surface 120 fits snugly against the edge 31 of mouth 30 for complete sealing and without leakage of liquid nectar even when the bottle 12 is completely full, such as during filling and refilling. Similarly, the pressure required to flex the button 112 downwardly by applying downward pressure on the actuator rod 116 should not be too great so as to minimize the amount of resistance the user would encounter when putting the removable cap 36 into the sealed position to force the actuator 116 downwardly.

Another hummingbird feeder in accordance with the present invention is shown in FIGS. 7-11 and generally designated by reference numeral 210. The feeder 210 includes a generally elliptical reservoir bottle or container 212 mounted on top of an elliptical feeding basin or liquid tray generally designated by reference numeral 214, similar in shape to feeder 110. The mounting is also similar to the prior embodiments in that the bottom of the container 212 is in the form of a bottleneck 230 with screw threads 232 which is screw-threaded into threads (not shown) of a generally vertical depending collar 234 located centrally in the cover 242 of feeding basin 214.

The generally elliptical container 212 has a large threaded opening 226 at its top end, which is closed by a removable threaded top or cap 236 into a sealed position, such as by a conventional ring seal 238. The cap 236 is preferably formed in two pieces with the central notch 250 opening downwardly in its lower surface. The mating threads of the removable cap 236 and opening 226 are also preferably configured of the "quarter turn" design.

Figure 9:
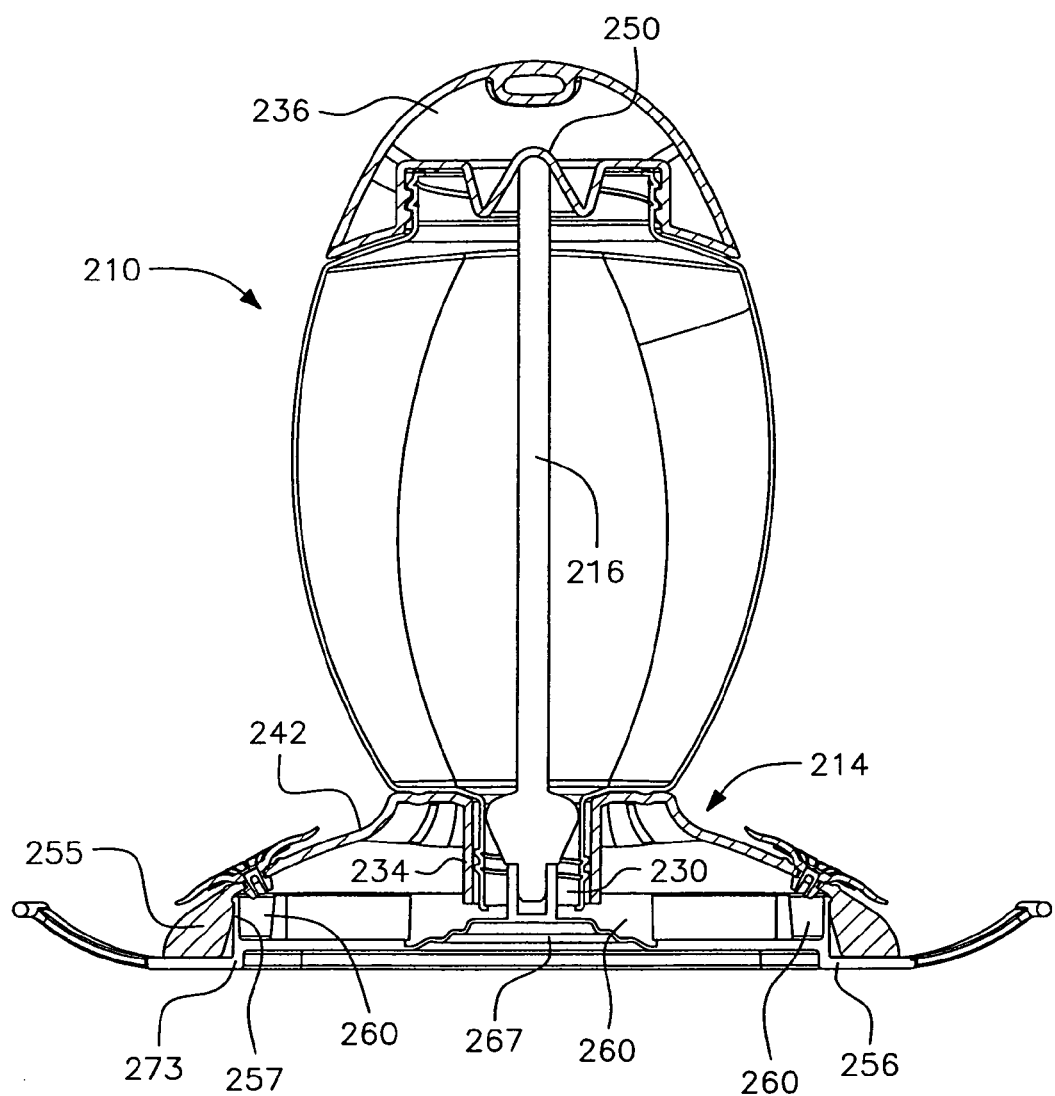
FIG. 9 is a cross-sectional side view of the hummingbird feeder of FIG. 7.
Figure 10:
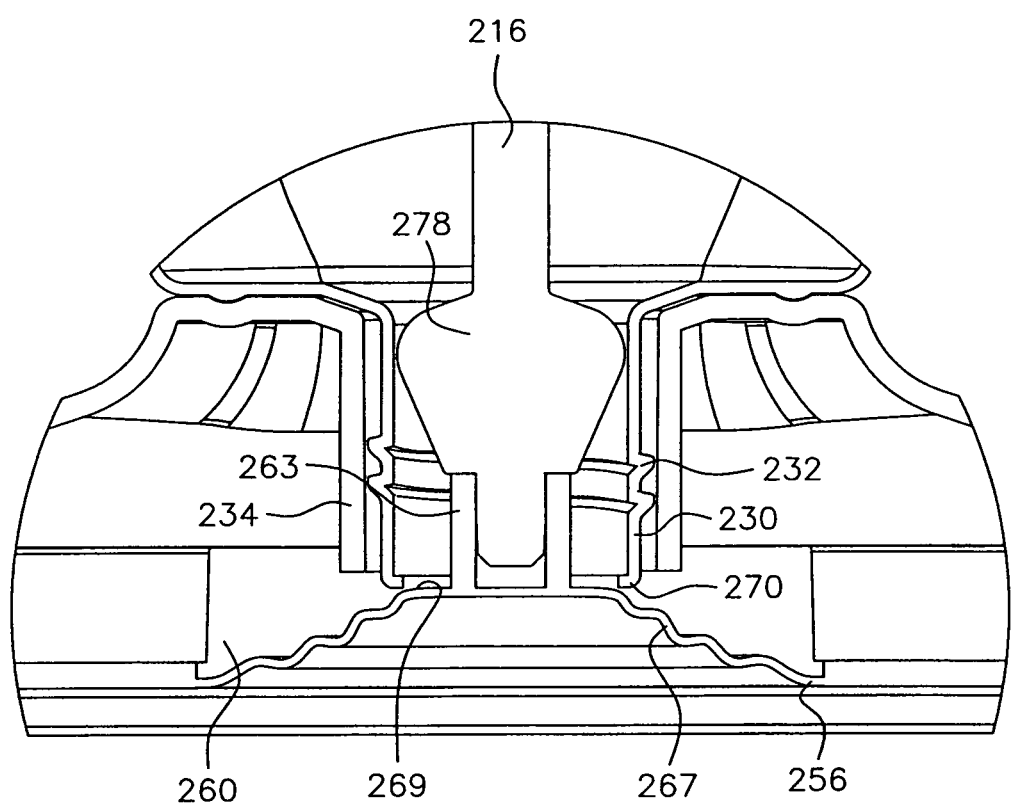
FIG. 10 is an enlarged cross-sectional side view of the hummingbird feeder of FIG. 7, showing the feeding basin and the lower end of the actuator rod attached at the center of the base of the feeding basin, with the sealing mechanism in the closed position.
Figure 11:
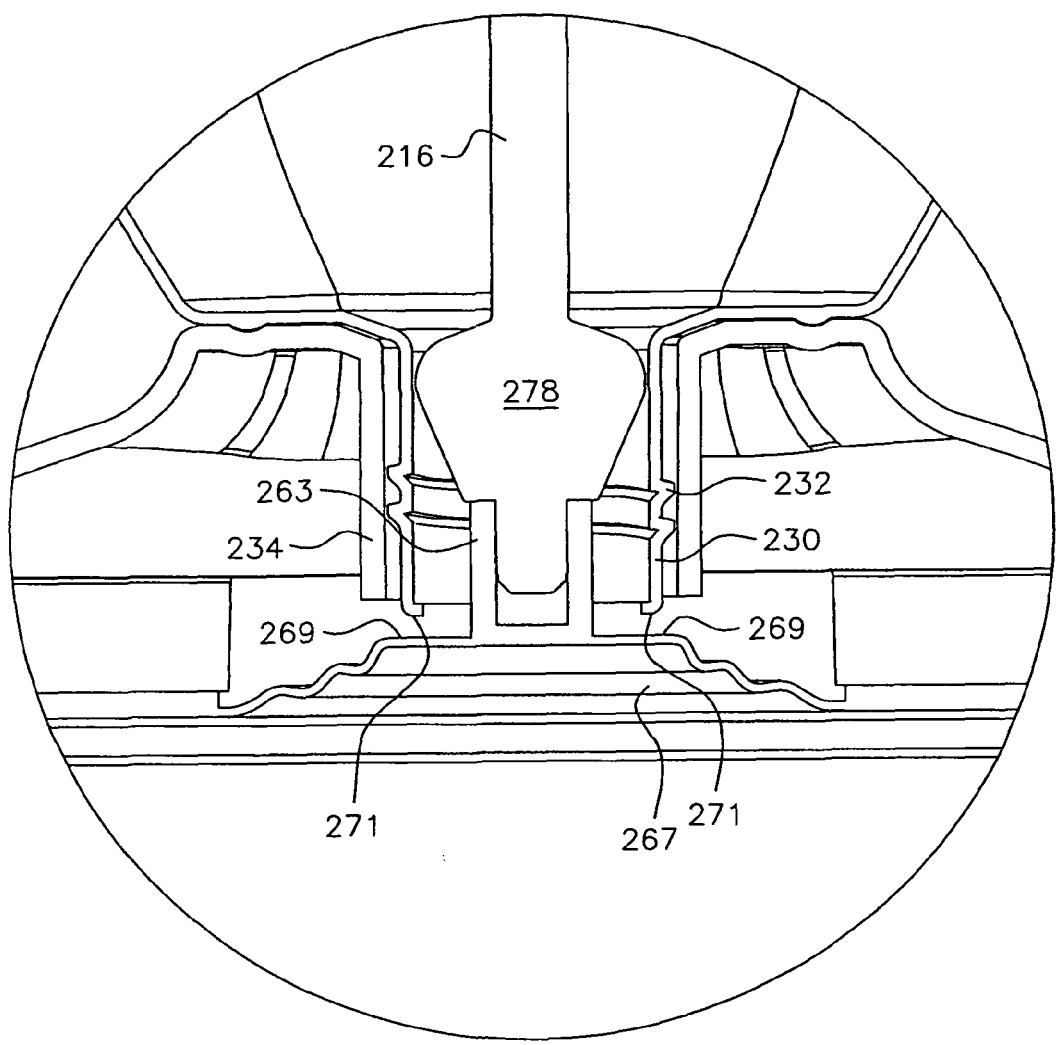
FIG. 11 is an enlarged cross-sectional side view of the hummingbird feeder of FIG. 7, similar to FIG. 10, but with the sealing mechanism in the open position.

In this embodiment the feeding basin 214 has a rigid cover 242 and a flexible, biased base 256. As in the earlier embodiments, the base has an upwardly extending flange 257 extending around it periphery and the cover has a depending flange 255 extending around its periphery which surrounds the upwardly extending flange 257, as shown in FIG. 9. These overlapping flanges 255 and 257 are similarly friction-fitted or otherwise snapped together so that they may be disengaged for cleaning.

The lower end of the actuator rod 216 preferably includes fins 278 for centralizing and aligning the actuator rod in the bottleneck mouth 230. The bottom of the actuator rod 216 is connected directly to a thickened central portion 263 of the flexible base 256. Any suitable connection can be used, such as mating threads or a projecting threaded portion at the end of the actuator rod which is held in place by a suitable locknut.

To provide the desired biased flexing of the flexible base 256, the base is molded with an annular spider 267 which allows the central portion of the base to move downwardly under the downward action of the actuator rod 216. When the central portion of the flexible base 256 is forced downwardly by the actuator rod 216, the base upper surface at 269 moves away from the lower edge 271 of the bottleneck opening 230 (see FIGS. 10 and 11) thus allowing nectar to flow out of reservoir bottle 212 and into holding chambers 260. When the cap 236 is unsealed and rod 216 is free to move up, the memory in the base central portion 263 causes it to move up and base surface 269 to re-engage edge 271, thus closing off fluid communication from bottle 212 into chambers 260. In the event the feeder 210 is resting on a solid surface, flexible base 256 has a depending support flange 273 which provides the necessary clearance so that the central portion 263 of the base can flex downwardly without contacting the supporting surface.

Figure 12:
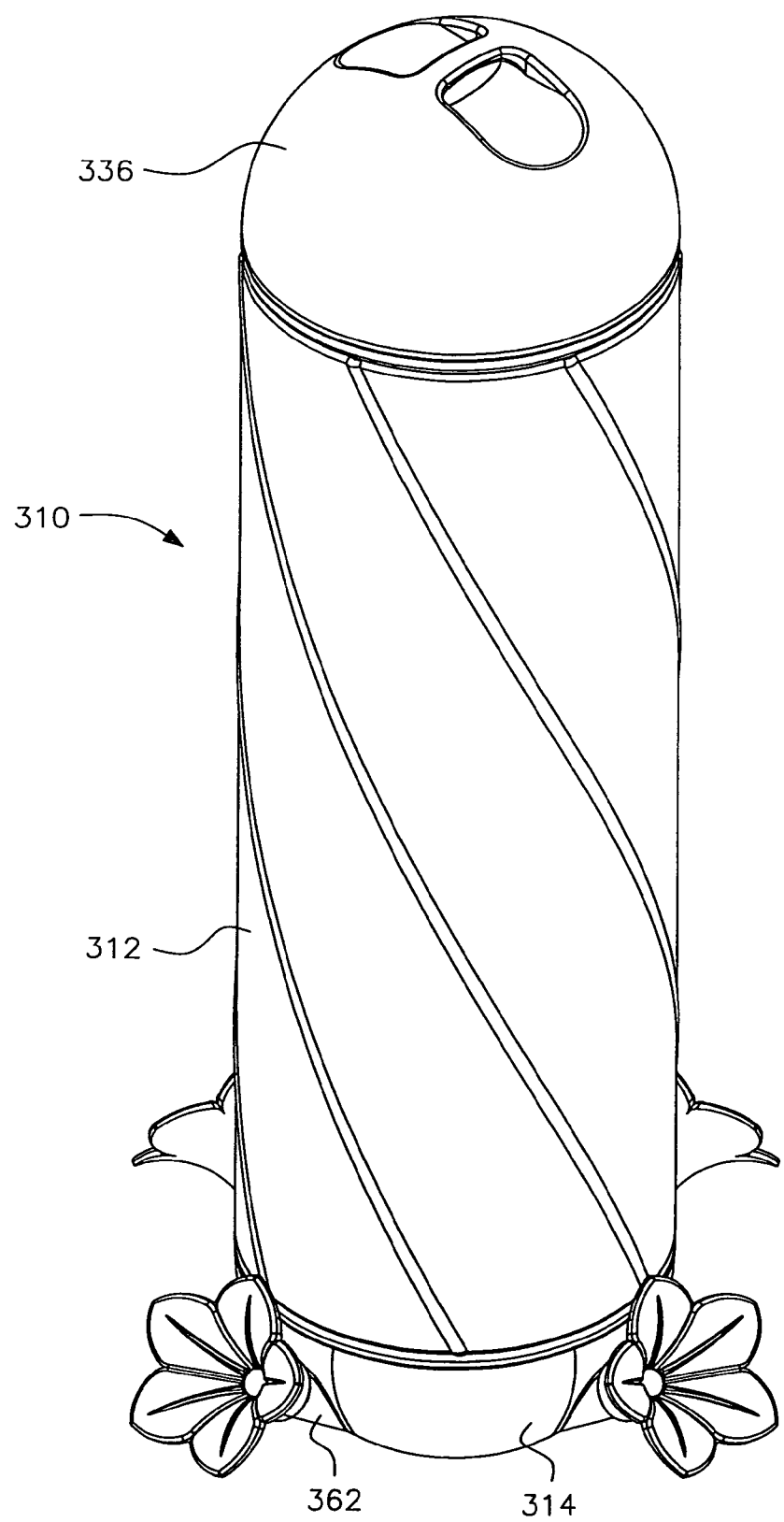
FIG. 12 is a perspective side view of a fourth embodiment of a hummingbird feeder according to the present invention.
Figure 13:
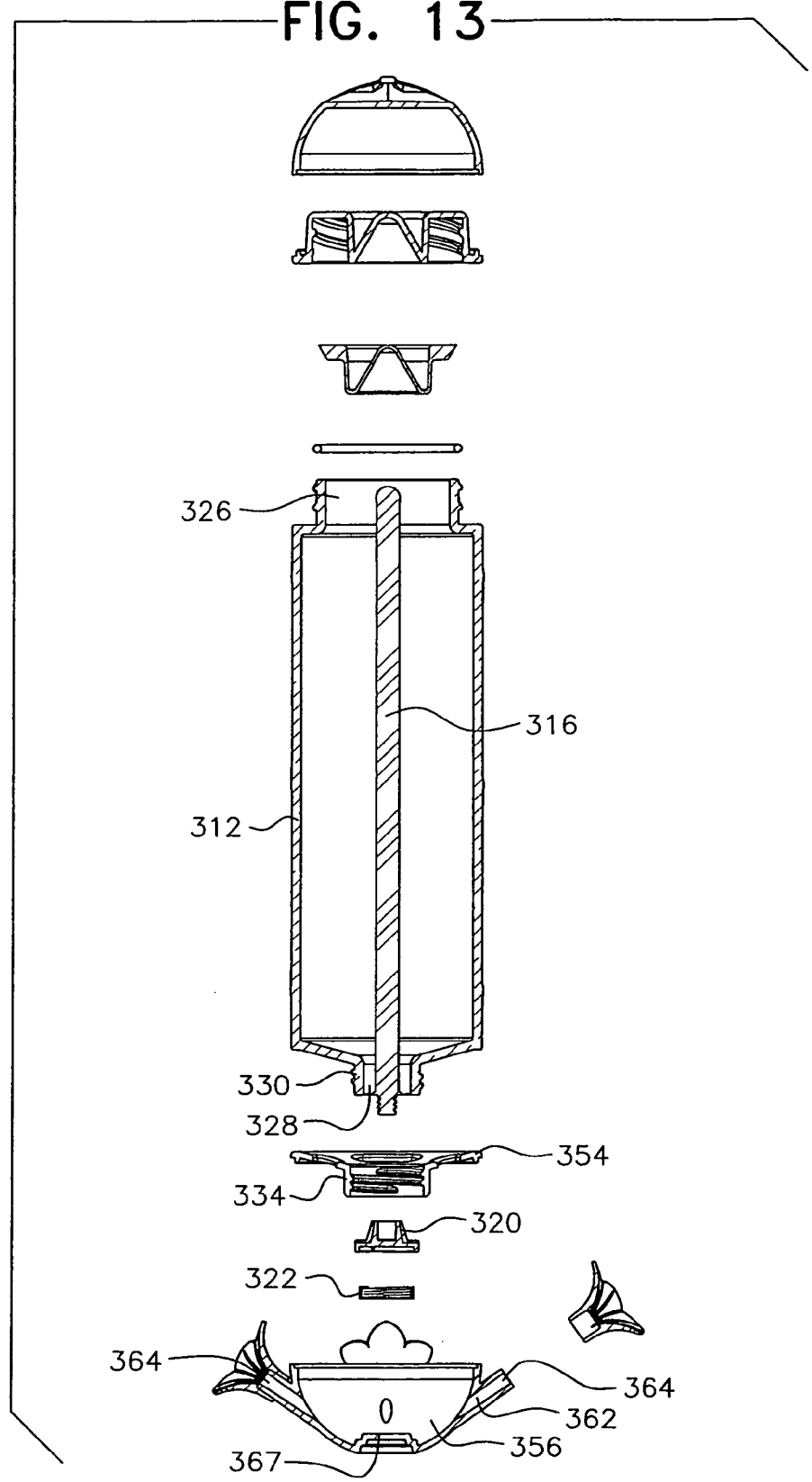
FIG. 13 is an exploded cross-sectional side view of the components of the hummingbird feeder of FIG. 12.
Figure 14:
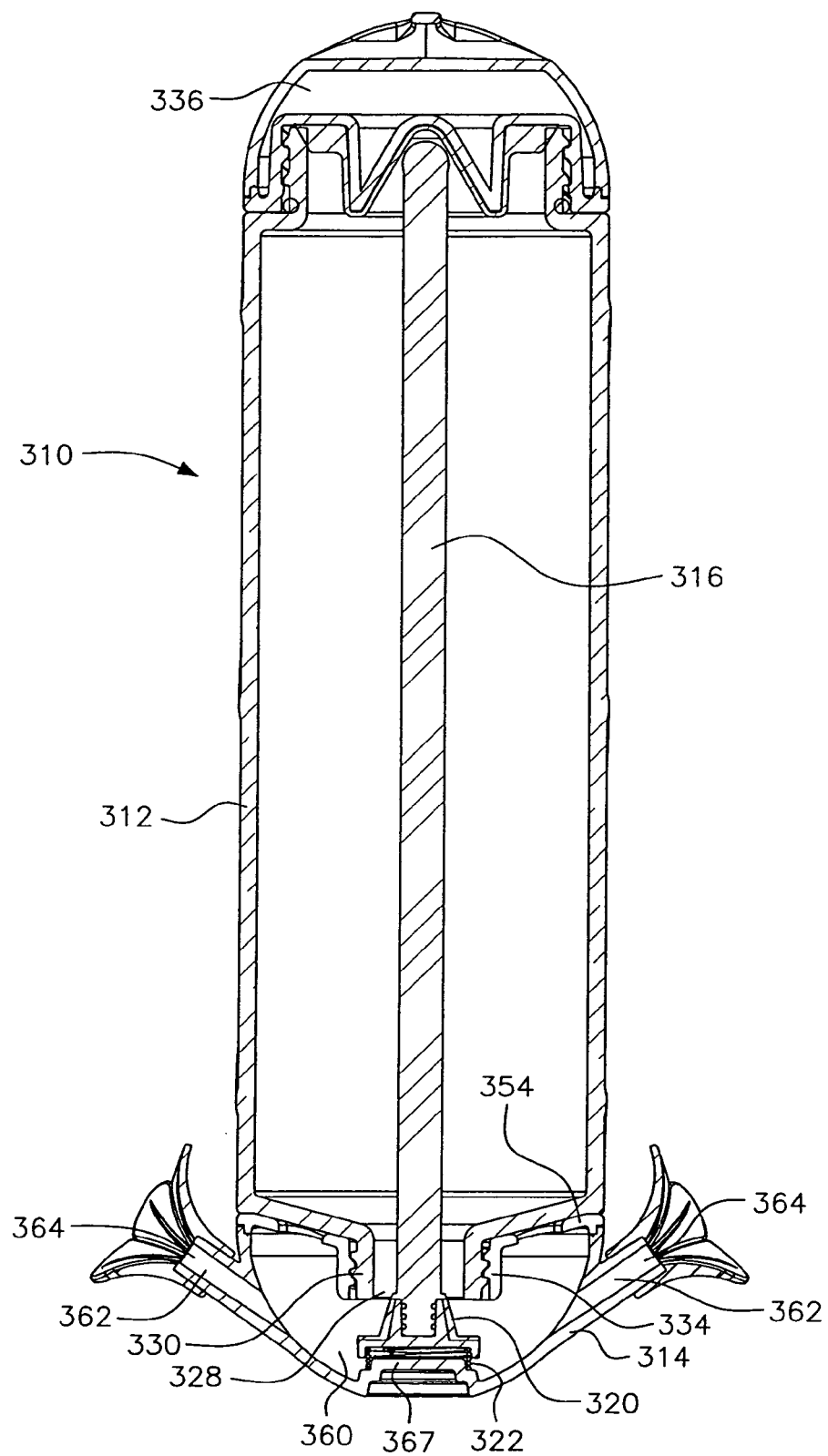
FIG. 14 is a cross-sectional side view of the hummingbird feeder of FIG. 12, with the feeder in the feeding position.
Figure 15:
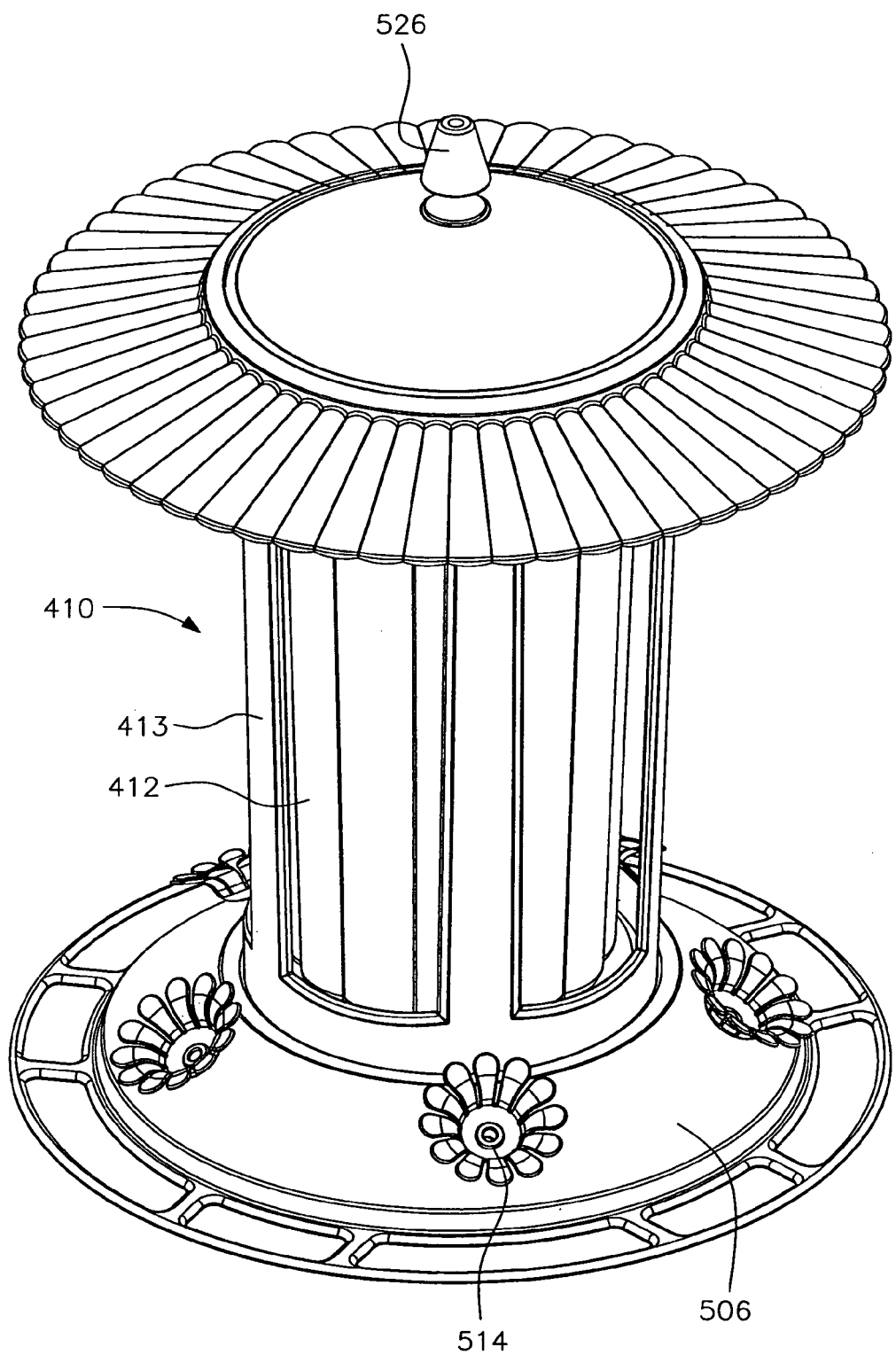
FIG. 15 is a perspective side view of a fifth embodiment of a hummingbird feeder according to the present invention, including a common functional feeding module surrounded by a decorative cladding.

Yet another embodiment of a hummingbird feeder in accordance with the present invention is shown in FIGS. 12-14 and is generally designated by reference numeral 310. Feeder 310 includes an actuator rod 316 and spring-biased stopper 320 similar to rod 16 and stopper 20 included in feeder 10. Feeder 310 differs from feeder 10, however, in its general overall shape and feeding openings. In particular, feeder 310 includes a generally cylindrical reservoir bottle 312 and a semi-spherical cap 336 representing the top half of a sphere, which is screw-threaded onto the large opening 326 at the upper end of the reservoir bottle. The smaller lower opening 328 is also in the form of a bottleneck 330 screw-threaded into a central collar 334 in the upper basin component or cover 354 of the feeding basin 314. The lower basin component or base 356 of the feeding basin 314 also has a semi-spherical shape, but representing the bottom half of a sphere and thus complimentary to the semi-spherical shape of the cap 336. The bottom of the base 356 includes a raised platform 362 at its center for seating of the spring 322 thereon. The actuator rod 316 and stopper 320 operate in the same manner as previously described for actuator rod 16 and stopper 20 of feeder 10.

The feeding basin 314 includes a liquid nectar holding chamber 360 which is in fluid communication with a plurality of arms 362 having feeding ports 364 at the ends thereof.

A final embodiment of a hummingbird feeder in accordance with the present invention is shown in FIGS. 15-23 and is generally designated by reference numeral 410. Feeder 410 includes a common functional feeding module, generally designated by reference numeral 411, which can be fit into different decorative claddings, such as cladding 413. The feeding module 411 includes a liquid holding container or reservoir bottle 412, preferably having a cylindrical shape, which is fitted above a feeding basin 414, preferably circular. Other shapes for the feeding module can be adopted for complimentarily shaped claddings. By utilizing a common functional feeding module, such as module 411, which can be fitted into different decorative claddings, it is no longer necessary to re-tool all of the components in order to produce a hummingbird feeder with a different decorative look. Further, the consumer may purchase alternate claddings in order to change the look of the hummingbird feeder in his/her garden without having to purchase a whole new feeder. Previously, the consumer who wanted to change the appearance of the hummingbird feeder needed to purchase a new feeder in order to achieve an alternate look.

In the preferred embodiment of the common functional feeding module 411, as shown, the generally cylindrical container 412 has a large threaded opening 426 at its top end, which is closed by a removable threaded top or cap 436 into a sealed position, such as by a conventional ring seal 438. The cap 436 is preferably molded in one piece with a central notch 450 opening downwardly in its lower surface. The mating threads of the removable cap 436 and opening 426 are also preferably configured of the "quarter turn" design.

Figure 18:
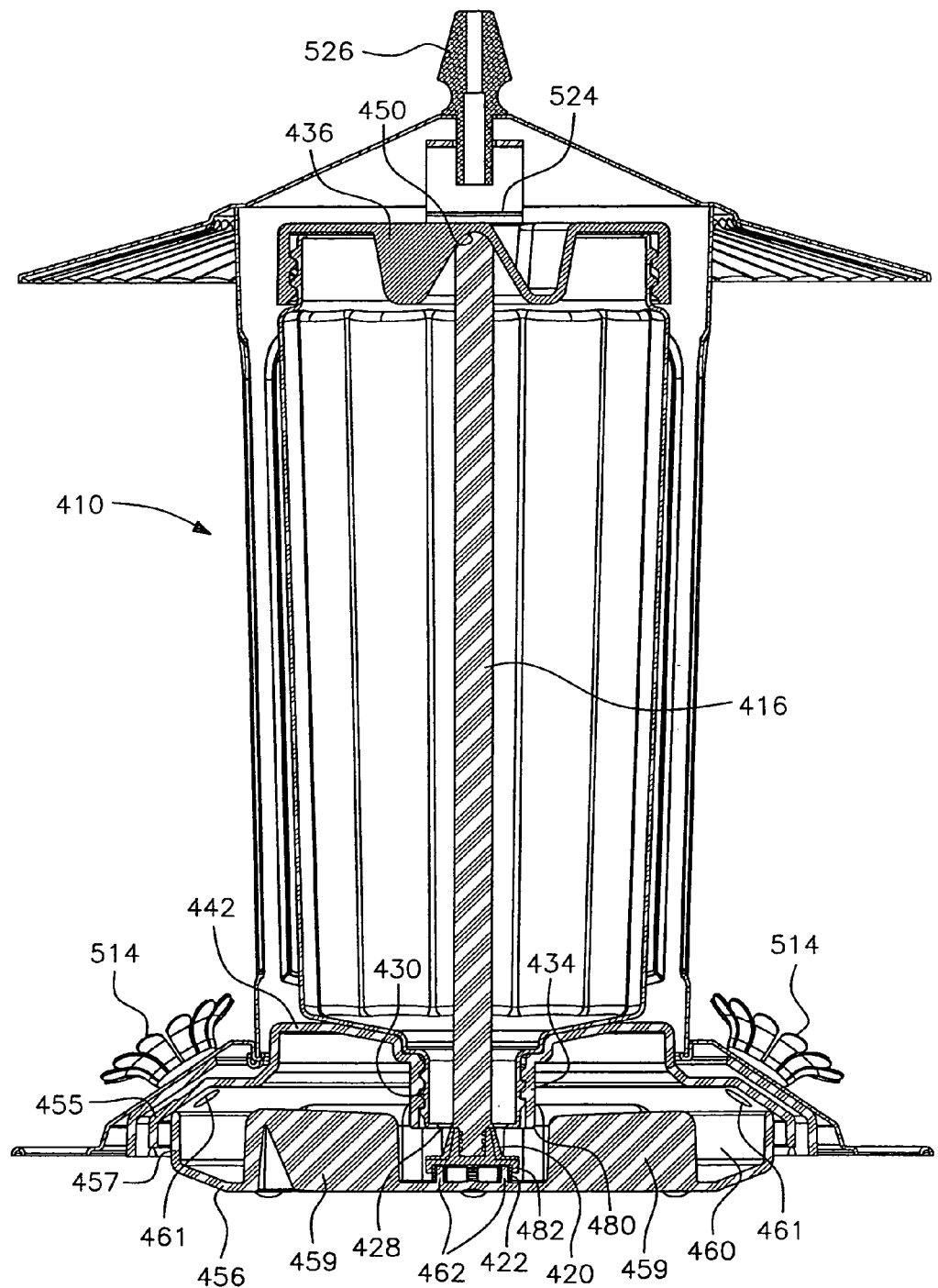
FIG. 18 is a cross-sectional side view of the hummingbird feeder of FIG. 15, with the feeder in the feeding position.
Figure 19:
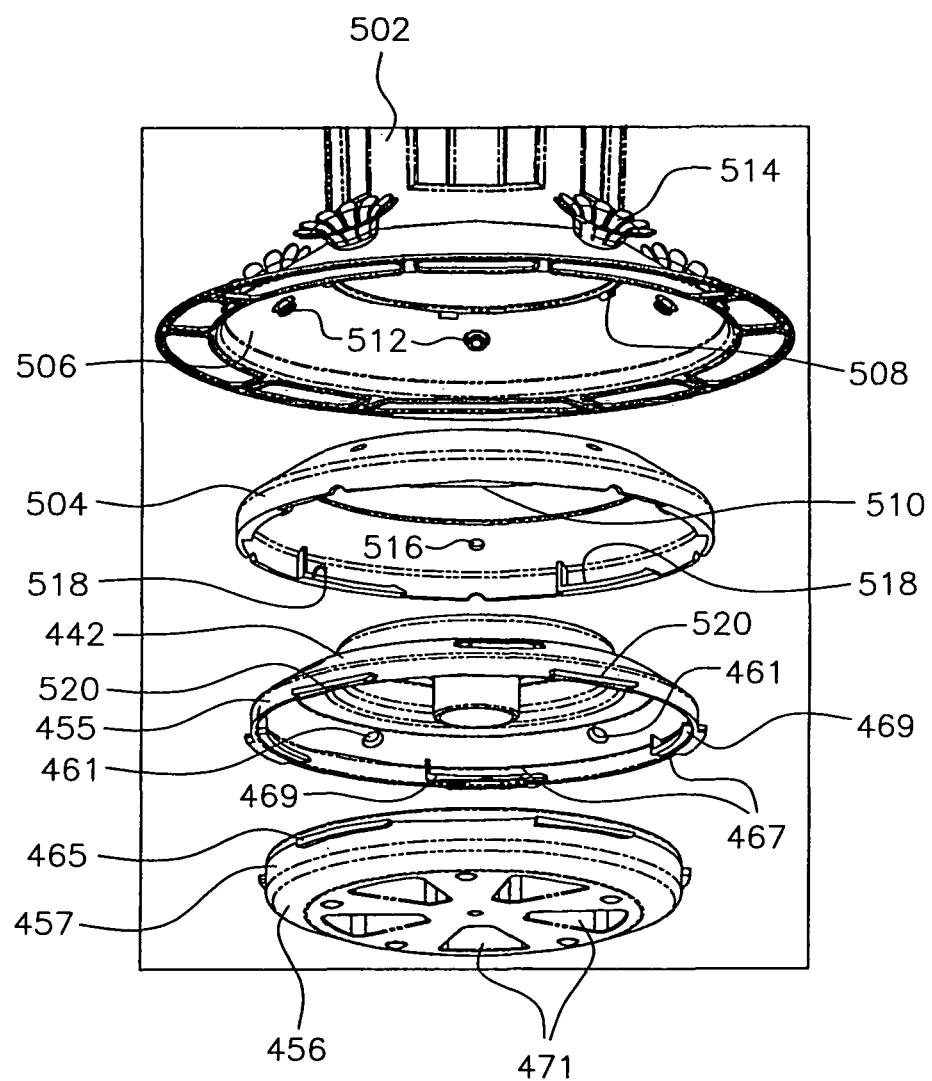
FIG. 19 is an exploded perspective view of the base of the decorative cladding and its associated locking ring and the upper and lower basin components which make up the feeding basin of the feeding module shown in FIG. 16.
Figure 20:
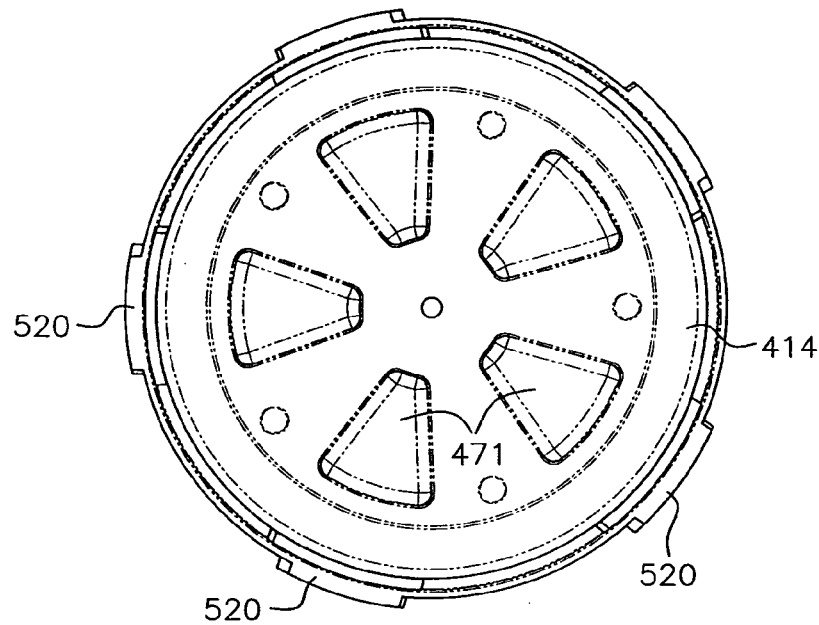
FIG. 20 is a bottom view of the feeding basin for the feeding module of FIG. 16.
Figure 21:
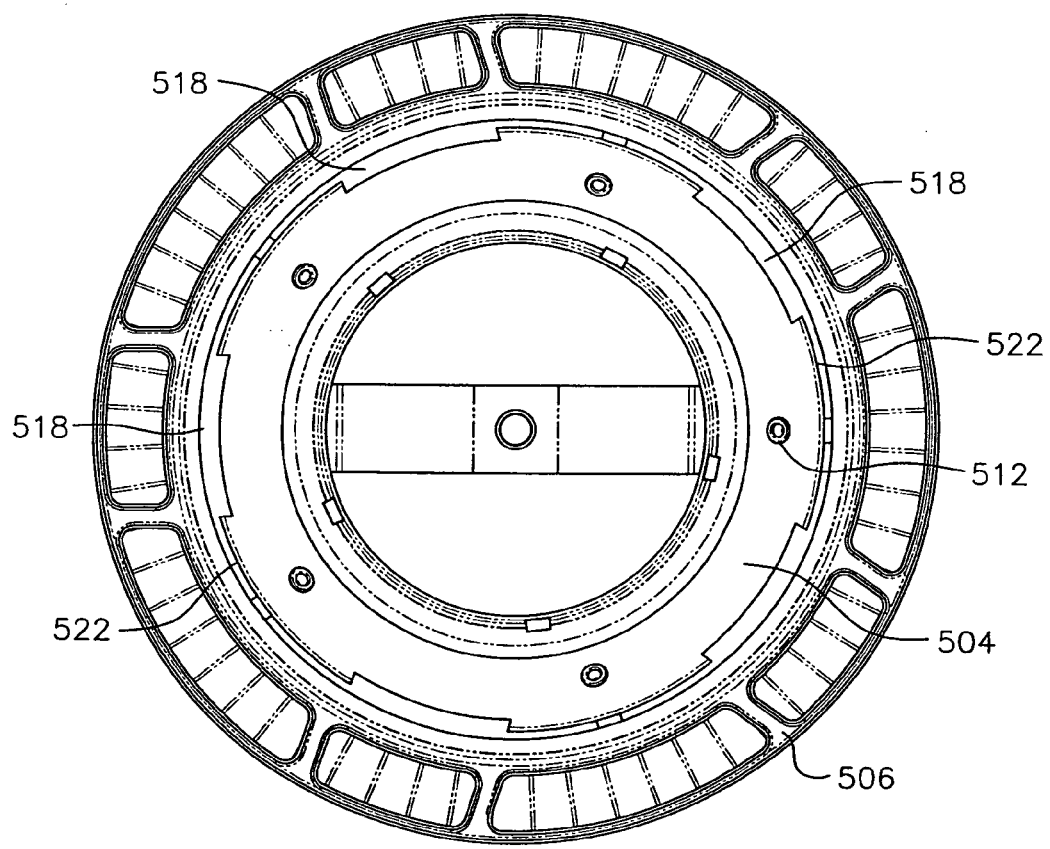
FIG. 21 is a bottom view of the decorative cladding, with the locking ring in place, shown in FIG. 16.

The feeding basin 414 of the feeding module 411 includes a rigid upper basin component or cover 442 and a rigid lower basin component or base 456. The lower basin component 456 has an upwardly extending flange 457 extending around its periphery, and the upper basin component 442 has a depending flange 455 extending around its periphery which surrounds the upwardly extending flange 457, as shown in FIG. 18. A plurality of slightly upwardly tapered circular tabs 465, which extend outwardly from flange 457, are configured to fit into complimentary tapered tab receptacles 467 formed by inwardly projecting flanges 469 on the inside surface of depending flange 455, when the lower basin component 456 is properly aligned within the upper basin component 442 and rotated with respect thereto. The fit is preferably an interference fit. When the tabs 465 are properly seated within tapered tab receptacles 467, the top edge of the lower basin component flange 457 presses against the inner wall of the upper basin component 442 to form interconnected sealed chambers 460 within the feeding basin 414.

As in earlier embodiments, the lower basin component 456 is preferably molded with upstanding protrusions 459 which help define the chambers 460 adjacent feeding ports 461. The complimentary notches 471 formed in the lower surface of the lower basin component by the protrusions 459 can be easily grasped in order to rotate the lower basin component 456 with respect to the upper basin component 455 when seating the tabs 465 in the tapered tab receptacles 467.

The feeding module 411 includes an actuator rod 416 and spring-biased stopper 420 similar to rod 16 and stopper 20 included in feeder 10. The lower bottle opening 428 of the reservoir bottle 412 is also in the form of a bottleneck 430 which is screw-threaded into a central collar 434 in the upper basin component 442 of the feeding basin 414. If desired to lower the "effective" edge of opening 428 of bottleneck 430 in order to reduce the nectar height in the basis 414, the lower edge 480 of the collar 434 could extend below the adjacent lower edge of the bottleneck 430. The bottom of the lower basin component 456 includes a plurality of raised projections 462 in a circular pattern at its center for seating of the spring 422 therearound. The actuator rod 416 and stopper 420 operate in the same manner as previously described for actuator rod 16 and stopper 20 of feeder 10.

Turning now to the decorative cladding 413, it is shaped to compliment the feeding module 411 and can take on any decorative appearance, such as cladding 413, as described previously. In a preferred embodiment as illustrated in the drawings, the cladding 413 includes a decorative outer shell 502 and a locking ring 504 assembled into the base 506 of the outer shell 504. The locking ring 504 is preferably made from a low cost polymeric material which can form a high precision interface to receive an innerlock with the feeding module 411. The locking ring 504 can be attached into the base 506 of the shell 502 by any conventional mechanism, such as by tabs 508 engaging around the circumference of opening 510 and rivets 512 associated with flower feeding ports 514 engaging in holes 516. The outer shell 502 can then be made of any durable material typical for decorative bird feeders. While the shutoff mechanism for the feeder 410 is the spring-biased stopper 420 and associated spring 422, the shutoff mechanism for feeder 410 could be any of the previously described embodiments of the spring, rubber button, or annular spider.

Figure 22:
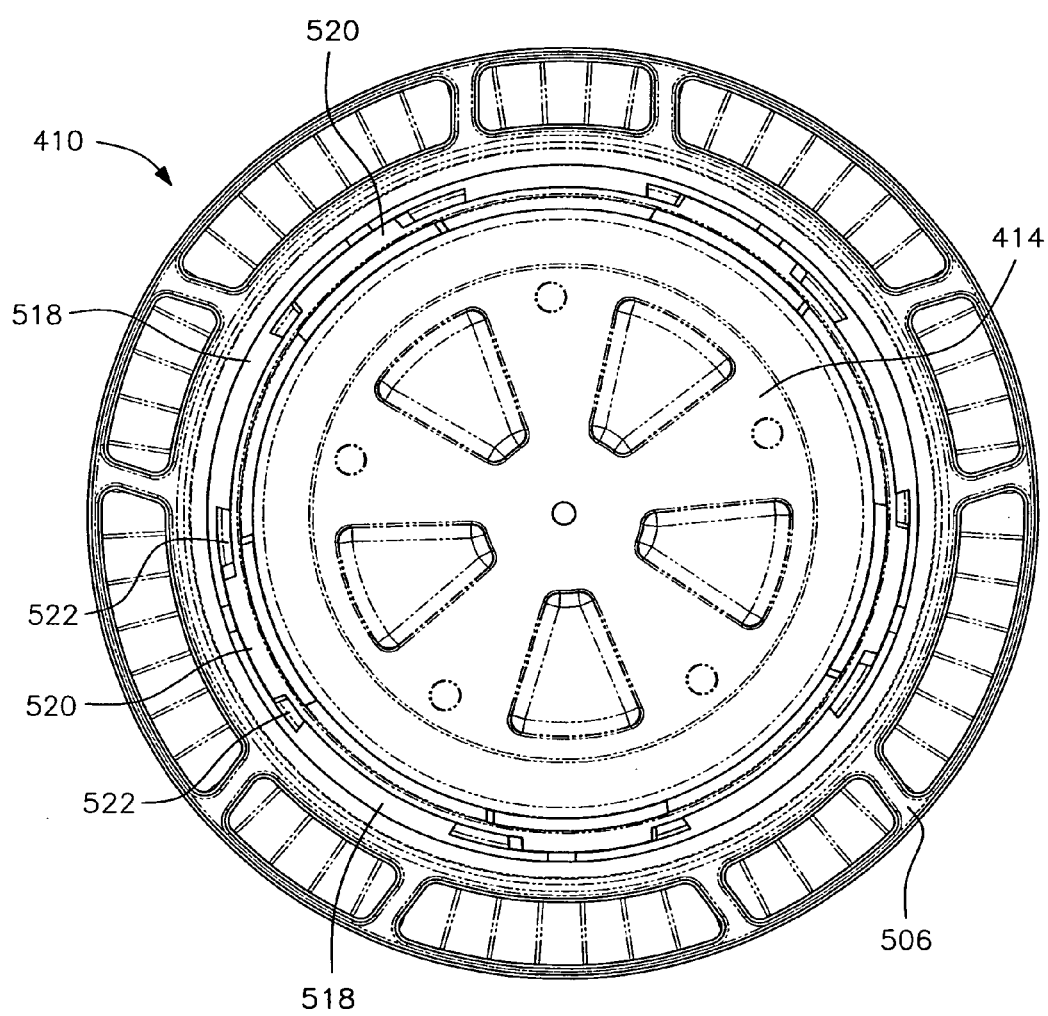
FIG. 22 is a bottom view of the common functional feeding module fitted into the decorative cladding of FIG. 16, before rotational locking therein.
Figure 23:
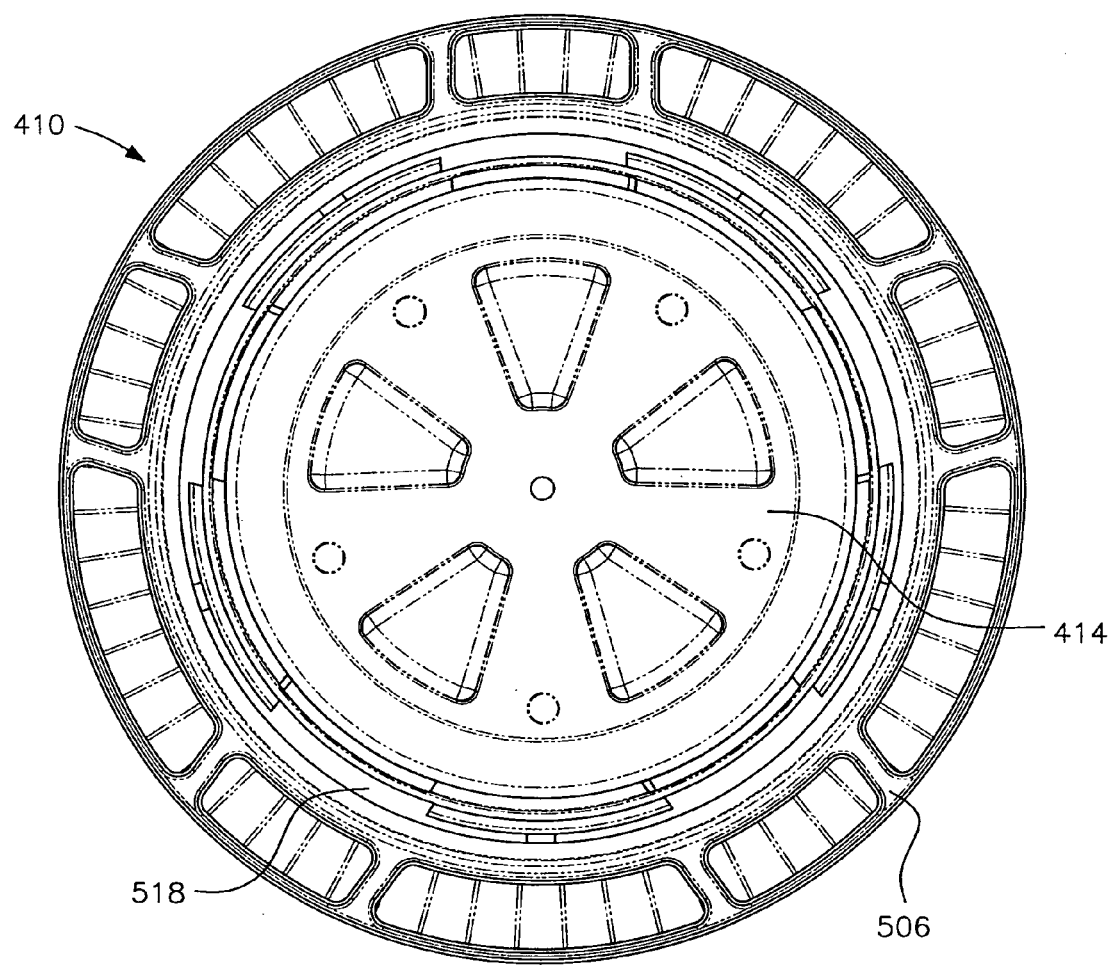
FIG. 23 is a bottom view of the common functional feeding module fitted into the decorative cladding of FIG. 16, after rotational locking therein.

The feeding module 411 fits into the decorative cladding 413 via a mechanical connection between upwardly tapered tab receptors 518 on the inside surface of the locking ring 504 and outwardly projecting tapered tabs 520 on the periphery of the feeding basin 414. Projecting tapered tabs 520 are preferably mounted on the outer surface of the upper basin component 455 opposite the tapered tab receptors 467 on the upper basin component inner surface. The feeding module 411 is inserted into the cladding 413 so that the feeding basin 414 fits into the locking ring 504 with the tapered tabs 520 located in spaces 522 between the tapered tab receptors 518, as shown in FIG. 22. The entire feeding module 411 is then rotated in the same direction as assembling the lower basin component 456 within the upper basin component 442, such as by using notches 471, until the tabs 520 are snugly received within tab receptors 518, as shown in FIG. 23.

As shown in FIG. 18, the height of the feeding module and the interior spacing of the cladding 413 are sized so that the top of cap 436 rests underneath spacer 524 of the cladding 413 when tabs 512 are frictionally received in tab receptors 518. The spacer can be a lock nut to hold the wire connector 526, as shown. The leading end of both tab receptors 467 and 518 include a raised portion 526 which acts against the trailing edge of tapered tabs 465 and 520, respectively, to prevent inadvertent rotational movement of the tabs in their respective tab receptors.

When the feeding module 411 is positioned into the decorative cladding 413 with the tabs 520 properly fitted into the tab receptors 518 by the requisite interference fit, the flower feeding ports formed by rivets 512 are properly aligned with the openings 461 in the feeding basin upper component 455. A hummingbird can then access nectar in chambers 460 through the flower feeding ports 514.

A user can refill the a hummingbird feeder according to the present invention using a simple three-step process: (1) unseal and remove the removable cap from the top opening of the container or bottle; (2) refill the container or bottle through the top opening; and (3) replace and reseal the removable cap on the top opening. This simplified process is extremely efficient and essentially foolproof, making it almost impossible for the consumer to make a mistake when filling or refilling a hummingbird feeder according to the present invention.

The hummingbird feeders according to the present invention also consist of simple mechanisms, which when activated, prohibit the free flow of nectar from the reservoir bottle to the feeding basin. All embodiments allow for incorporation of a large top-fill bottle opening which facilitates easier, reduced step filling procedures and greater cleaning accessibility when compared to traditional hummingbird feeders. The embodiments preferably utilize the "quarter turn" top-fill bottle caps and threads to achieve the desired effectiveness of the feeders. Since the vacuum within the reservoir bottle is eliminated the instant that the top-fill cap seal is broken, the minimum time possible to stop free flow of nectar from the bottle to the feeding basin and out through the ports is desired. Stopping the free flow of nectar to the feeding basin is accomplished by sealing off the lower bottleneck side of the bottle. The mechanism designed to accomplish this function is directly reliant on release of pressure on the actuator rod, which occurs when the top-fill quarter turn cap is removed. The quarter turn threads utilized on the top-fill caps significantly reduce the time required for the cap to be removed. This in turn minimizes the length of time needed for the actuator rod to move up and position the various sealing mechanism into their sealing position.

The quarter turn threads are also helpful when replacing the top-fill caps. The instant that the actuator rod begins its downward movement, the sealing mechanism in each embodiment is separated from the lower bottle opening, allowing free flow of nectar from the bottle into the feeding basin. Free flow of nectar from the bottle to the feeding basin and out through the ports will continue until the bottle is empty or a vacuum is achieved within the bottle. Therefore, the shortest time possible from initiation of actuator rod depression to complete top cap sealing is desirable.

The hummingbird feeders of the present invention can be made of a variety of materials. Commonly, the reservoir bottle and feeding basin will be made of suitable plastic materials, including polyolefins such a polyethylene and polypropylene, polyvinyl chloride (PVC), polycarbonates and acrylics, because of the advantageous properties of these materials, such a strength, weight, impermeability to liquids, ease of manufacture and coloration. The parts can be made by conventional means, such as injection molding. Some of the parts could also be made of metal or wood, if desired. The sealing mechanism is preferably made of an elastomeric, deformable material, such as silicone, rubber, or a hard core material coated with an elastomer or the like. The elastomeric material allows the sealing mechanism to form a more effective seal when placed in the sealing position. Silicone is a preferred material due to its durability, conformability, resilience and availability. The actuator rod can be formed as one piece with the sealing mechanism, or the actuator rod and the sealing mechanism can be separate parts which are assembled together, such as by interference fit or threaded engagement.

The foregoing is considered as illustrative only of the principles of the invention. Further, since numerous modifications and changes may readily occur to those skilled in the art, it is not desired to limit the invention to the exact construction and operation described and shown. Accordingly, all suitable modifications and equivalents may be resorted to that fall within the scope of the invention as defined by the following claims.

What is claimed is:

1. A top-fill liquid hummingbird feeder comprising:
   (a) a reservoir bottle having a top end with an opening and a bottom end opening;
   (b) a removable cap for sealing the top end opening;
   (c) a feeding basin connected to the bottom end opening and having at least one feeding port;
   (d) a sealing mechanism associated with said bottom end opening to move between a closed position closing said bottom end opening and an open position opening said bottom end; and
   (e) a removable decorative cladding into which said reservoir bottle is inserted so that said cladding fits over and encloses said reservoir bottle including said bottle top end when the feeder is assembled for use, said cladding being positioned so that said feeding port is unobstructed by said cladding when said cladding is in place.

2. The hummingbird feeder of claim 1, wherein said sealing mechanism includes an actuator rod extending through said reservoir bottle and movable between a down position and an up position by sealing and unsealing, respectively, said cap from said top end opening.

3. The hummingbird feeder of claim 1, wherein the cladding includes an upper shell and a base, said upper shell enclosing said reservoir bottle and said base covering at least part of an upper surface of said feeding basin, said base having at least one opening that is aligned with the feeding port when the feeder is assembled to allow hummingbirds to access nectar in said feeding basin, neither said upper shell nor said base interfering with any bird's access to the feeding port.

4. The hummingbird feeder of claim 1, wherein the reservoir bottle, the removable cap, the feeding basin, and the sealing mechanism are part of a common functional feeding module connected to said decorative cladding when said reservoir bottle is inserted into said cladding.

5. The hummingbird feeder of claim 4, wherein the feeding module is connected within the decorative cladding by an interference fit.

6. The hummingbird feeder of claim 1, wherein the sealing mechanism is upwardly biased to said closed position.

7. The hummingbird feeder of claim 6, wherein said upward bias is achieved by a spring action associated with a base of the feeding basin.

8. The hummingbird feeder of claim 4, wherein the decorative cladding includes an outer shell and a locking ring assembled into a base of said outer shell, said locking ring being configured to secure said feeding module within said outer shell.

9. The hummingbird feeder of claim 7, wherein the base of said feeding basin is rigid and the spring action is caused by a compression spring supported by the base.

10. The hummingbird feeder of claim 8, wherein said feeding basin includes connecting elements configured to engage with complementary connecting elements on said locking ring to couple said feeding basin to said cladding outer shell base when the feeding module is fully inserted into the cladding.

11. A method of filling a top-fill liquid hummingbird feeder comprising:
   (1) providing a top-fill hummingbird feeder including a reservoir bottle having a top end with an opening and a bottom end with an opening, a removable cap for sealing said top end opening, a feeding basin connected to the bottom end opening and having at least one feeding port, and a sealing mechanism associated with said bottom end opening and movable between a closed position and an open position, said reservoir bottle, cap, feeding basin and sealing mechanism when assembled forming a common functional feeding module, and a decorative cladding having an outer shell and a base, said outer shell configured to surround said reservoir bottle and said base having an upper surface with at least one opening therein to align with the at least one feeding port of said feeding basin when the feeder is assembled;

(2) removing the common functional feeding module as assembled with the reservoir bottle, cap, feeding basin and sealing mechanism from within the decorative cladding to expose the removable cap on the reservoir bottle;

(3) removing the removable cap and moving said sealing mechanism to said closed position;

(4) pouring hummingbird liquid feed into the reservoir bottle through said top end opening;

(5) replacing the removable top to a sealed condition and moving said sealing mechanism to said open position;

(6) inserting the common functional feeding module as assembled with the reservoir bottle, cap, feeding basin and sealing mechanism back into the decorative cladding with the reservoir bottle top end and the cap being inserted into the cladding first, said step of inserting including moving the functional feeding module into said decorative cladding until an upper surface of said feeding basin is adjacent a lower surface of said cladding base;

(7) rotationally aligning said at least one opening in said cladding base with said at least one feeding port in the feeding basin so that a hummingbird can access nectar in the basin by inserting its beak through the aligned base opening and feeding port; and (8) securing said module to said cladding.

12. The method of claim 11, wherein the step of inserting includes, after the feeding module is fully within the cladding, fitting the feeding basin into a locking ring positioned adjacent a base of said cladding.

13. The method of claim 12, wherein the step of fitting includes aligning connecting elements on the feeding basin with cooperating connecting elements on said locking ring and rotating the feeding basin with respect to the locking ring to engage the connecting elements and couple the feeding basin to the locking ring with the feeding module held within the cladding.

14. The method of claim 12, wherein the step of removing the common functional feeding module includes rotating the feeding basin with respect to the locking ring to disengage cooperating connecting elements on the locking ring and feeding basin, and then drawing the common functional feeding module downwardly out of the cladding with the reservoir bottle top end and cap being removed from said cladding last.

15. A top-fill liquid hummingbird feeder comprising a feeding module including a liquid container having a sealable top opening and a bottom opening, a feeding basin configured to immerse said bottom opening in liquid, said feeding basin having an upper component with at least one feeding port formed therein, a sealing mechanism to close said container bottom opening to enable said liquid container to be filled through said sealable top opening, and a decorative cladding including an elongated member with a central opening that receives the liquid container of said feeding module so that said liquid container is surrounded by said elongated member when said hummingbird feeder is assembled for use, said cladding further including a base member coupled to a lower end of said elongated member, said base member having a larger circumference than said elongated member and being shaped to fit over at least part of said basin upper component, said base member further having at least one opening therein which, when aligned with the basin feeding port during assembly, allows hummingbirds to access nectar in said basin through said base member opening and said aligned feeding port.

16. The hummingbird feeder of claim 15, wherein said bottom opening of said liquid container is in the form of a vertically oriented bottleneck and said cladding covers a top end of said liquid container.

17. The hummingbird feeder of claim 16, wherein said feeding basin includes a vertically oriented cylindrical collar configured to receive said bottleneck of said liquid container.

18. The hummingbird feeder of claim 15, wherein said sealing mechanism includes an actuator rod and an upwardly biased surface which selectively seals and unseals said bottom opening when actuated by said actuator rod.

19. The hummingbird feeder of claim 15, wherein said liquid container includes a removable cap for sealing said top opening and said removable cap moves an actuator rod of said sealing mechanism to open said bottom opening when said cap is moved from an unsealed position to a sealed position over said top opening.

20. The hummingbird feeder of claim 1, wherein said decorative cladding is interchangeable with at least one other decorative cladding that is different in appearance in order to change an overall appearance of the feeder.

\* \* \* \* \*